(12) United States Patent  
Kondo et al.

(10) Patent No.: US 7,957,471 B2
(45) Date of Patent: Jun. 7, 2011

(54) ENCODING APPARATUS AND METHOD, DECODING APPARATUS AND METHOD, IMAGE PROCESSING SYSTEM AND METHOD, AND RECORDING MEDIUM

(75) Inventors: Tetsujiro Kondo, Tokyo (JP); Sakon Yamamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 1535 days.

(21) Appl. No.: 11/338,643

(22) Filed: Jan. 25, 2006

(65) Prior Publication Data

US 2006/0182350 A1 Aug. 17, 2006

(30) Foreign Application Priority Data

Feb. 4, 2005 (JP) ................................ P2005-028911

(51) Int. Cl.
*H04N 11/02* (2006.01)
(52) U.S. Cl. ......... 375/240.26; 375/240.01; 375/240.24; 375/240.22
(58) Field of Classification Search ............ 375/240.01, 375/240.26, 240.24, 240.22
See application file for complete search history.

(56) References Cited

U.S. PATENT DOCUMENTS 5,613,015 A * 3/1997 Suzuki et al. ................. 382/173
5,673,339 A * 9/1997 Lee ............................... 382/236

FOREIGN PATENT DOCUMENTS

| JP | 10-289522 | 10/1998 |
| JP | 11-155143 | 6/1999 |
| JP | 2001-245270 | 9/2001 |
| JP | 2003-259368 | 9/2003 |
| JP | 2004-289685 | 10/2004 |

\* cited by examiner

*Primary Examiner* — Chieh M Fan
*Assistant Examiner* — Siu M Lee
(74) *Attorney, Agent, or Firm* — Finnegan, Henderson, Farabow, Garrett & Dunner, L.L.P.

(57) ABSTRACT

In encoding input image data including first and second images, the first image is divided into blocks. A second block corresponding to a first block that is one of the blocks is detected from the second image. Pixels forming the first and second blocks are sorted in order according to pixel values. Block difference data indicating the amount of change in the pixel values of the sorted pixels between the first and second blocks is determined and encoded. In decoding, block information identifying the second block, sort-order information indicating the sorted pixels forming the first block, and the encoded block difference data are obtained. The encoded block difference data is decoded. The decoded block difference data and the second block identified by the block information are used to generate pixel values of the first block. The generated pixel values are reverse-sorted according to the sort-order information.

24 Claims, 23 Drawing Sheets

FIG. 8

| CANDIDATE BLOCK | DYNAMIC RANGE | MINIMUM VALUE |
|---|---|---|
| $BP_1$ | 20 | 32 |
| $BP_2$ | 21 | 32 |
| $BP_3$ | 25 | 33 |
| ⋮ | ⋮ | ⋮ |
| $BP_{288}$ | 107 | 52 |
| $BP_{289}$ | 100 | 55 |

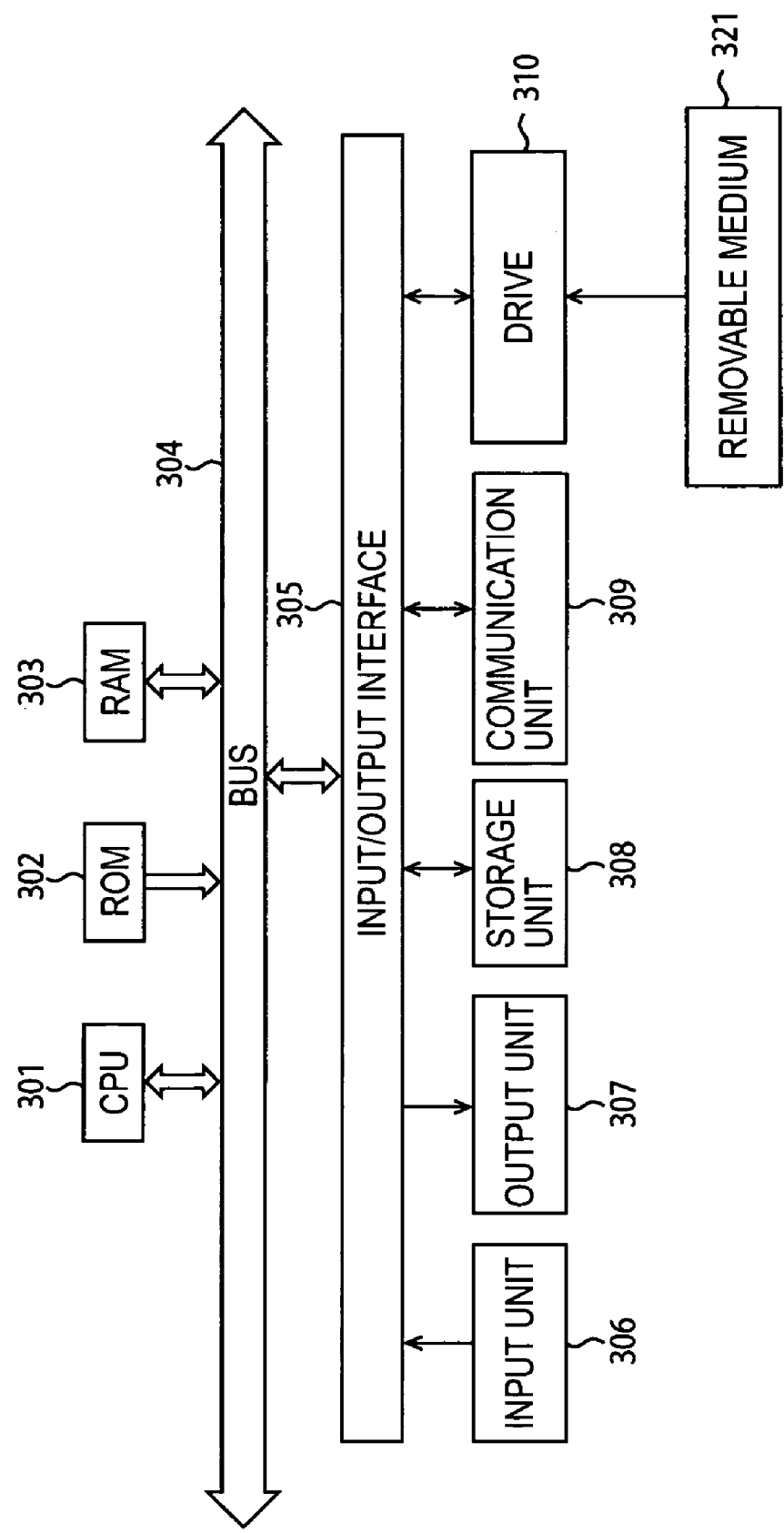

US 7,957,471 B2

ENCODING APPARATUS AND METHOD, DECODING APPARATUS AND METHOD, IMAGE PROCESSING SYSTEM AND METHOD, AND RECORDING MEDIUM

CROSS REFERENCES TO RELATED APPLICATIONS

The present invention contains subject matter related to Japanese Patent Application JP 2005-028911 filed in the Japanese Patent Office on Feb. 4, 2005, the entire contents of which are incorporated herein by reference.

BACKGROUND OF THE INVENTION

1. Field of the Invention

The present invention relates to encoding apparatuses and methods, decoding apparatuses and methods, image processing systems and methods, and recording media. More specifically, the present invention relates to an encoding apparatus and method, a decoding apparatus and method, an image processing system and method, and a recording medium for preventing unauthorized copying using analog signals.

2. Description of the Related Art

Recently, digital recording and playback apparatuses adapted to record content, such as television programs, onto recording media, such as hard disks (HDs) and digital versatile disks (DVDs), by means of digital signals have increasingly become popular.

With the increase in the popularity of digital recording and playback apparatuses using HDs and DVDs as recording media, subscribers or users have been able to easily record television programs onto such recording media with high quality.

The popularity of the digital recording and playback apparatuses also provide the opportunity for unauthorized copying of commercial content, such as DVD content, of television programs, movies, and so forth.

FIG. 1 shows an example structure of an image processing system 1 that plays back content recorded on a recording medium to display the content on a display and that records the played back content onto another recording medium.

In FIG. 1, the image processing system 1 includes a playback apparatus 11, a display 12, and a recording apparatus 13. The playback apparatus 11 plays back an image signal of content recorded on a recording medium, such as an optical disk, e.g., a DVD, and obtains an analog image signal Van. The display 12 displays, as an image, the analog image signal Van output from the playback apparatus 11. The recording apparatus 13 performs recording onto a recording medium, such as an optical disk, using the analog image signal Van output from the playback apparatus 11.

The playback apparatus 11 includes a decoder 21 and a digital-to-analog (D/A) converter 22. The decoder 21 decodes an encoded digital image signal read from a recording medium (not shown), and supplies the decoded digital image signal to the D/A converter 22. The D/A converter 22 converts the digital image signal supplied from the decoder 21 into an analog image signal Van, and outputs the analog image signal Van.

The display 12 is composed of, for example, a cathode-ray tube (CRT), a liquid crystal display (LCD), or the like. The display 12 displays, as an image, the analog image signal Van from the D/A converter 22, and allows the user to view the image corresponding to the image signal recorded on the recording medium.

The analog image signal Van output from the playback apparatus 11 is also supplied (input) to the recording apparatus 13.

The recording apparatus 13 includes an analog-to-digital (A/D) converter 31, an encoder 32, and a recorder 33, and records the input analog image signal Van onto a recording medium (not shown), such as an optical disk.

The analog image signal Van output from the playback apparatus 11 is supplied to the A/D converter 31. The A/D converter 31 converts the supplied analog image signal Van into a digital image signal Vdg, and supplies the digital image signal Vdg to the encoder 32. The encoder 32 encodes the digital image signal Vdg from the A/D converter 31, and supplies the encoded digital image signal, namely, Vcd, to the recorder 33. The recorder 33 records the encoded digital image signal Vcd onto a recording medium.

In the image processing system 1 having the above-described structure, the analog image signal Van output from the playback apparatus 11 is used to record an image signal onto a recording medium different from the played back recording medium. There is also a possibility of unauthorized copying of content (i.e., an image signal of content) using the analog-image signal Van output from the playback apparatus 11.

In an approach of the related art to prevent such unauthorized copying using the analog image signal Van, when copyright is protected, the analog image signal Van is scrambled and is then output, or the output of the analog image signal Van is prohibited. This approach is disclosed in, for example, Japanese Unexamined Patent Application Publication No. 2001-245270.

Another approach is to provide a digital video apparatus disclosed in Japanese Unexamined Patent Application Publication No. 10-289522. In this digital video apparatus, a compression decoder on the playback side or a compression encoder on the recording side or both the decoder and the encoder include a noise information generator, and noise information that cannot be identified at the time of image playback by one iteration of processing is embedded in digital video data so that the image can be copied although the image that is copied a plurality of times is greatly degraded in quality, thereby substantially limiting the number of times copying can be performed.

The approach disclosed in Japanese Unexamined Patent Application Publication No. 2001-245270, in which the analog image signal Van is scrambled and is then output or the output of the analog image signal Van is prohibited, can prevent unauthorized copying. However, there arises another problem of also preventing a normal image from being displayed on the display 12.

The approach disclosed in Japanese Unexamined Patent Application Publication No. 10-289522, in which noise information is embedded by the compression decoder on the playback side or the compression encoder on the recording side, needs a noise information generator and a circuit for embedding the noise information, thus increasing the circuit size.

The present inventors have proposed a technique for preventing unauthorized copying using analog image signals without problems, such as the prevention of displaying an image and the increased circuit size. This technique is disclosed in, for example, Japanese Unexamined Patent Application Publication No. 2004-289685.

SUMMARY OF THE INVENTION

The technique disclosed in Japanese Unexamined Patent Application Publication No. 2004-289685 focuses on analog noise, such as phase shifting of digital image signals that is induced by A/D conversion of analog image signals. The encoding of the phase-shifted digital image signals with attention to the analog noise disables high-quality copying while maintaining the quality equivalent to that of the original image, thereby preventing unauthorized copying using the analog image signals. With the recent general distribution of digital content, however, a further approach to prevent unauthorized copying has been needed.

It is therefore desirable to prevent unauthorized copying using analog signals.

An encoding apparatus according to an embodiment of the present invention includes the following elements. A block dividing unit divides a first image into a plurality of blocks. A corresponding-block detecting unit detects from a second image a second block corresponding to a first block that is one of the plurality of blocks. A sorting unit sorts pixels forming each of the first block and the second block in order according to pixel values. A difference data determining unit determines block difference data indicating the amount of change in the pixel values of the sorted pixels between the first block and the second block. An encoding unit encodes the block difference data.

The encoding apparatus may further include a noise-adding unit that adds noise to the input image data.

The encoding unit may encode the block difference data by performing a discrete sine transform (DST) on the block difference data to determine a DST coefficient and quantizing the DST coefficient.

The corresponding-block detecting unit may include the following elements. A candidate block extracting unit extracts from the second image a plurality of candidate blocks that are candidates of the second block. A parameter determining unit determines a parameter for each of the plurality of candidate blocks, the parameter indicating a feature value of pixels forming each candidate block. A block detecting unit detects the second block corresponding to the first block from the plurality of candidate blocks on the basis of the parameter.

The parameter may include at least a dynamic range of pixel values of the pixels forming each of the candidate blocks. The block detecting unit may detect one of the candidate blocks as the second block, the candidate block having a dynamic range that matches a dynamic range of the first block.

The difference data determining unit may determine the block difference data by determining pixel differences for the pixels forming each of the first block and the second block, the pixel differences being differences between pixel values and a minimum pixel value of pixels forming each block, and determining differences between the pixel differences of the first block and the pixel differences of the second block.

The encoding apparatus may further include an output unit that outputs block information identifying the second block from the second image, sort-order information indicating a sort result of sorting the pixels forming the first block, and the block difference data encoded by the encoding unit.

An encoding method according to an embodiment of the present invention includes the steps of dividing a first image into a plurality of blocks; detecting from a second image a second block corresponding to a first block that is one of the plurality of blocks; sorting pixels forming each of the first block and the second block in order according to pixel values; determining block difference data indicating the amount of change in the pixel values of the sorted pixels between the first block and the second block; and encoding the block difference data.

A program recorded on a first recording medium according to an embodiment of the present invention includes the steps of dividing a first image into a plurality of blocks; detecting from a second image a second block corresponding to a first block that is one of the plurality of blocks; sorting pixels forming each of the first block and the second block in order according to pixel values; determining block difference data indicating the amount of change in the pixel values of the sorted pixels between the first block and the second block; and encoding the block difference data.

In the encoding apparatus and method and the first recording medium, therefore, a first image is divided into a plurality of blocks. A second block corresponding to a first block that is one of the plurality of blocks is detected from a second image. Pixels forming each of the first and second blocks are sorted in order according to pixel values. Block difference data indicating the amount of change in the pixel values of the sorted pixels between the first block and the second block is determined and encoded.

A first decoding apparatus according to an embodiment of the present invention includes the following elements. An obtaining unit obtains a first minimum value, block information, sort-order information, and encoded block difference data. The first minimum value is a minimum value of pixel values of pixels forming a first block that is one of a plurality of blocks into which a first image is divided. The block information identifies a second block corresponding to the first block in a second image different from the first image. The sort-order information indicates a sort result of sorting the pixels forming the first block in order according to pixel differences, the pixel differences being differences between pixel values and a minimum pixel value of pixels forming each block. The encoded block difference data is obtained by encoding block difference data indicating the amount of change in the pixel differences for the sorted pixels between the first block and the second block. A block difference data decoding unit decodes the encoded block difference data into the block difference data. A generating unit generates pixel values of the pixels forming the first block using the block difference data decoded by the block difference data decoding unit, the pixel differences for the pixels forming the second block identified by the block information, and the first minimum value. A reverse-sorting unit reverse-sorts the pixel values of the pixels forming the first block generated by the generating unit in a spatial phase prior to the sorting according to the sort-order information.

The decoding apparatus may further include a noise-adding unit that adds noise to an output of the reverse-sorting unit.

The block difference data decoding unit may decode the encoded block difference data into the block difference data by dequantizing the encoded block difference data and performing an inverse discrete sine transform (IDST) on the dequantized encoded block difference data.

The generating unit may generate the pixel values of the pixels forming the first block by determining pixel differences between the pixel values of the pixels forming the second block and a second minimum value that is a minimum value of the pixel values of the pixels forming the second block, and adding the block difference data and the first minimum value to the determined pixel differences.

A dynamic range of the pixel values of the pixels forming the second block identified by the block information may match a dynamic range of the pixel values of the pixels forming the first block.

A first decoding method according to an embodiment of the present invention includes the steps of obtaining a first minimum value, block information, sort-order information, and encoded block difference data, the first minimum value being a minimum value of pixel values of pixels forming a first block that is one of a plurality of blocks into which a first image is divided, the block information identifying a second block corresponding to the first block in a second image different from the first image, the sort-order information indicating a sort result of sorting the pixels forming the first block in order according to pixel differences, the pixel differences being differences between pixel values and a minimum pixel value of pixels forming each block, the encoded block difference data being obtained by encoding block difference data indicating the amount of change in the pixel differences for the sorted pixels between the first block and the second block; decoding the encoded block difference data into the block difference data; generating pixel values of the pixels forming the first block using the block difference data decoded in the step of decoding, the pixel differences for the pixels forming the second block identified by the block information, and the first minimum value; and reverse-sorting the pixel values of the pixels forming the first block generated in the step of generating in a spatial phase prior to the sorting according to the sort-order information.

A program recorded on a second recording medium according to an embodiment of the present invention includes the steps of obtaining a first minimum value, block information, sort-order information, and encoded block difference data, the first minimum value being a minimum value of pixel values of pixels forming a first block that is one of a plurality of blocks into which a first image is divided, the block information identifying a second block corresponding to the first block in a second image different from the first image, the sort-order information indicating a sort result of sorting the pixels forming the first block in order according to pixel differences, the pixel difference being differences between pixel values and a minimum pixel value of pixels forming each block, the encoded block difference data being obtained by encoding block difference data indicating the amount of change in the pixel differences for the sorted pixels between the first block and the second block; decoding the encoded block difference data into the block difference data; generating pixel values of the pixels forming the first block using the block difference data decoded in the step of decoding, the pixel differences for the pixels forming the second block identified by the block information, and the first minimum value; and reverse-sorting the pixel values of the pixels forming the first block generated in the step of generating in a spatial phase prior to the sorting according to the sort-order information.

In the first decoding apparatus and method and the second recording medium, therefore, a first minimum value that is a minimum value of pixel values of pixels forming a first block that is one of a plurality of blocks into which a first image is divided, block information identifying a second block corresponding to the first block in a second image different from the first image, sort-order information indicating a sort result of sorting the pixels forming the first block in order according to pixel differences that are differences between pixel values and a minimum pixel value of pixels forming each block, and encoded block difference data obtained by encoding block difference data indicating the amount of change in the pixel differences for the sorted pixels between the first block and the second block are obtained. The encoded block difference data is decoded into block difference data. The decoded block difference data, the pixel differences for the pixels forming the second block identified by the block information, and the first minimum value are used to generate pixel values of the pixels forming the first block. The generated pixel values of the pixels forming the first block are then reverse-sorted in a spatial phase prior to the sorting according to the sort-order information.

A first image processing system according to an embodiment of the present invention includes an encoder including the following elements. A block dividing unit divides a first image into a plurality of blocks. A corresponding-block detecting unit detects from a second image a second block corresponding to a first block that is one of the plurality of blocks. A sorting unit sorts pixels forming each of the first block and the second block in order according to pixel values. A difference data determining unit determines block difference data indicating the amount of change in the pixel values of the sorted pixels between the first block and the second block. An encoding unit encodes the block difference data.

In the first image processing system, therefore, a first image is divided into a plurality of blocks. A second block corresponding to a first block that is one of the plurality of blocks is detected from a second image. Pixels forming each of the first and second blocks are sorted in order according to pixel values. Block difference data indicating the amount of change in the pixel values of the sorted pixels between the first block and the second block is determined and encoded.

A second image processing system according to an embodiment of the present invention includes a decoder including the following elements. An obtaining unit that obtains a first minimum value, block information, sort-order information, and encoded block difference data. The first minimum value is a minimum value of pixel values of pixels forming a first block that is one of a plurality of blocks into which a first image is divided. The block information identifies a second block corresponding to the first block in a second image different from the first image. The sort-order information indicates a sort result of sorting the pixels forming the first block in order according to pixel differences, the pixel differences being differences between pixel values and a minimum pixel value of pixels forming each block. The encoded block difference data is obtained by encoding block difference data indicating the amount of change in the pixel differences for the sorted pixels between the first block and the second block. A block difference data decoding unit decodes the encoded block difference data into the block difference data. A generating unit generates pixel values of the pixels forming the first block using the block difference data decoded by the block difference data decoding unit, the pixel differences for the pixels forming the second block identified by the block information, and the first minimum value. A reverse-sorting unit reverse-sorts the pixel values of the pixels forming the first block generated by the generating unit in a spatial phase prior to the sorting according to the sort-order information.

In the second image processing system, therefore, a first minimum value that is a minimum value of pixel values of pixels forming a first block that is one of a plurality of blocks into which a first image is divided, block information identifying a second block corresponding to the first block in a second image different from the first image, sort-order information indicating a sort result of sorting the pixels forming the first block in order according to pixel differences that are differences between pixel values and a minimum pixel value of pixels forming each block, and encoded block difference data obtained by encoding block difference data indicating the amount of change in the pixel differences for the sorted pixels between the first block and the second block are obtained. The encoded block difference data is decoded into block difference data. The decoded block difference data, the pixel differences for the pixels forming the second block identified by the block information, and the first minimum value are used to generate pixel values of the pixels forming the first block. The generated pixel values of the pixels forming the first block are then reverse-sorted in a spatial phase prior to the sorting according to the sort-order information.

A second decoding apparatus according to an embodiment of the present invention includes the following elements. An obtaining unit obtains block information, sort-order information, and encoded block difference data. The block information identifies a block corresponding to a first block that is one of a plurality of blocks into which a first image is divided, as a second block, from a second image different from the first image. The sort-order information indicates a sort result of sorting pixels forming the first block in order according to pixel values. The encoded block difference data is obtained by encoding block difference data indicating the amount of change in the pixel values of the sorted pixels between the first block and the second block. A block difference data decoding unit decodes the encoded block difference data into the block difference data. A generating unit generates pixel values of the pixels forming the first block using the block difference data decoded by the block difference data decoding unit and the pixel values of the pixels forming the second block identified by the block information. A reverse-sorting unit reverse-sorts the pixel values of the pixels forming the first block generated by the generating unit in a spatial phase prior to the sorting according to the sort-order information.

A second decoding method according to an embodiment of the present invention includes the steps of obtaining block information, sort-order information, and encoded block difference data, the block information identifying a block corresponding to a first block that is one of a plurality of blocks into which a first image is divided, as a second block, from a second image different from the first image, the sort-order information indicating a sort result of sorting pixels forming the first block in order according to pixel values, the encoded block difference data being obtained by encoding block difference data indicating the amount of change in the pixel values of the sorted pixels between the first block and the second block; decoding the encoded block difference data into the block difference data; generating pixel values of the pixels forming the first block using the block difference data decoded in the step of decoding and the pixel values of the pixels forming the second block identified by the block information; and reverse-sorting the pixel values of the pixels forming the first block generated in the step of generating in a spatial phase prior to the sorting according to the sort-order information.

In the second decoding apparatus and method, therefore, block information identifying a block corresponding to a first block that is one of a plurality of blocks into which a first image is divided, as a second block, from a second image different from the first image, sort-order information indicating a sort result of sorting pixels forming the first block in order according to pixel values, and encoded block difference data obtained by encoding block difference data indicating the amount of change in the pixel values of the sorted pixels between the first block and the second block are obtained. The encoded block difference data is decoded into block difference data. The decoded block difference data and the pixel values of the pixels forming the second block identified by the block information are used to generate pixel values of the pixels forming the first block. The generated pixel values of the pixels forming the first block are then reverse-sorted in a spatial phase prior to the sorting according to the sort-order information.

A third image processing system according to an embodiment of the present invention includes an encoder that encodes input image data including at least a first image and a second image, and a decoder that decodes the encoded input image data, wherein encoding and decoding are repeatedly performed on the input image data, thereby reducing quality of an image corresponding to the input image data. The decoder includes the following elements. An obtaining unit obtains block information, sort-order information, and encoded block difference data. The block information identifies a block corresponding to a first block that is one of a plurality of blocks into which a first image is divided, as a second block, from a second image different from the first image. The sort-order information indicates a sort result of sorting pixels forming the first block in order according to pixel values. The encoded block difference data is obtained by encoding block difference data indicating the amount of change in the pixel values of the sorted pixels between the first block and the second block. A block difference data decoding unit decodes the encoded block difference data into the block difference data. A generating unit generates pixel values of the pixels forming the first block using the block difference data decoded by the block difference data decoding unit and the pixel values of the pixels forming the second block identified by the block information. A reverse-sorting unit reverse-sorts the pixel values of the pixels forming the first block generated by the generating unit in a spatial phase prior to the sorting according to the sort-order information.

In the third image processing system, therefore, block information identifying a block corresponding to a first block that is one of a plurality of blocks into which a first image is divided, as a second block, from a second image different from the first image, sort-order information indicating a sort result of sorting pixels forming the first block in order according to pixel values, and encoded block difference data obtained by encoding block difference data indicating the amount of change in the pixel values of the sorted pixels between the first block and the second block are obtained. The encoded block difference data is decoded into block difference data. The decoded block difference data and the pixel values of the pixels forming the second block identified by the block information are used to generate pixel values of the pixels forming the first block. The generated pixel values of the pixels forming the first block are then reverse-sorted in a spatial phase prior to the sorting according to the sort-order information.

BRIEF DESCRIPTION OF THE DRAWINGS

FIG. 8 is a diagram showing an operation of the encoder 152;

FIG. 23 is a block diagram showing an example structure of a computer according to an embodiment of the present invention.

DESCRIPTION OF THE PREFERRED EMBODIMENTS

Figure 1:
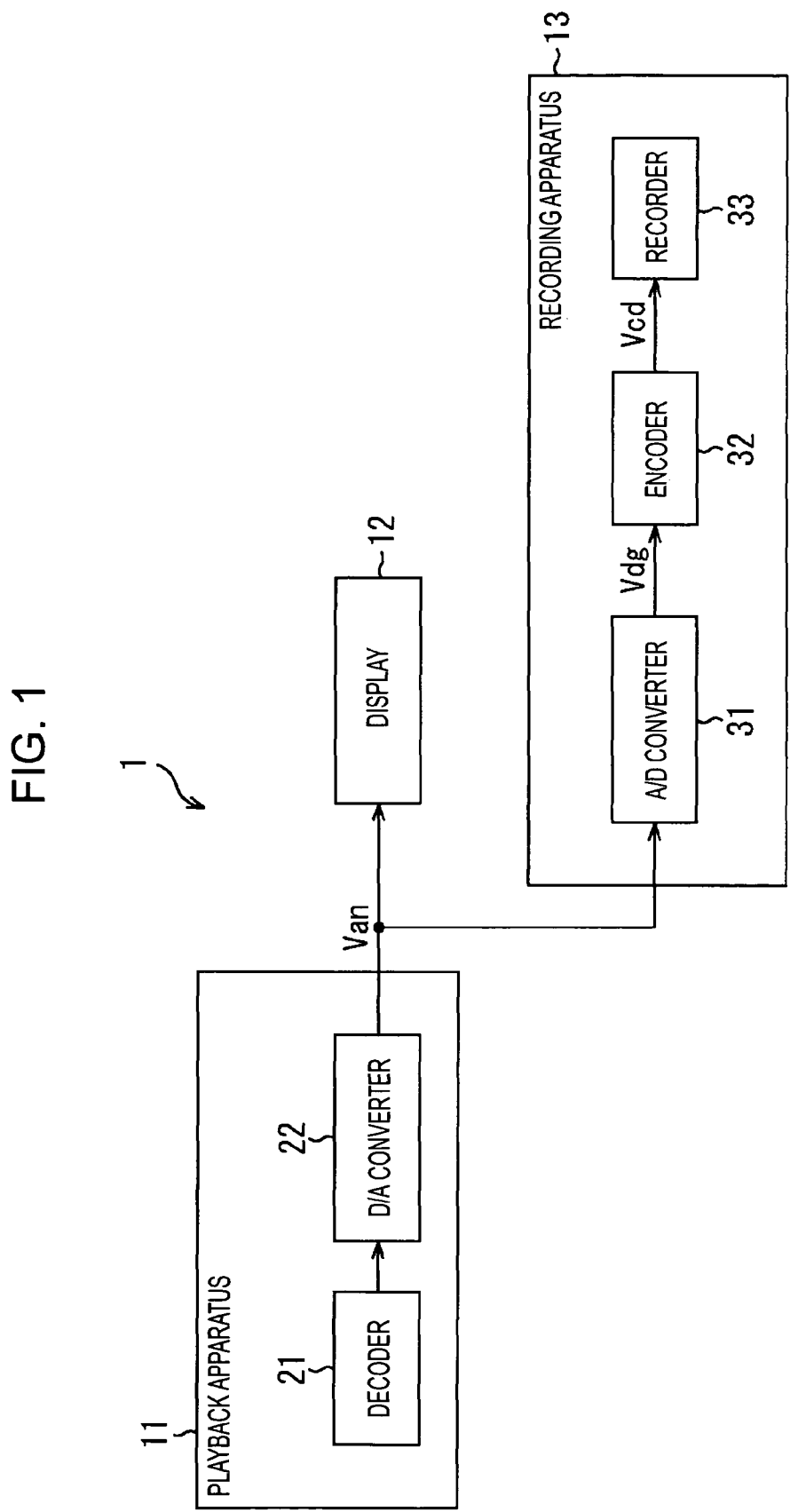
FIG. 1 is a block diagram showing an example structure of an image processing system of the related art.

Before describing an embodiment of the present invention, the correspondence between the features of the claims and the specific elements disclosed in an embodiment of the present invention is discussed below. This description is intended to assure that embodiments supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the aspects of the invention disclosed in the embodiments are described in the claims. That is, the description does not deny the existence of aspects of the present invention that are described in the embodiments but not claimed in the invention of this application, i.e., the existence of aspects of the present invention that in future may be claimed by a divisional application, or that may be additionally claimed through amendments.

According to an embodiment of the present invention, an encoding apparatus (e.g., a recording unit 141 shown in FIG. 2) for encoding input image data including at least a first image and a second image includes the following elements. A block dividing unit (e.g., a block forming circuit 221 shown in FIG. 3) divides the first image into a plurality of blocks. A corresponding-block detecting unit (e.g., a corresponding-block detecting circuit 213 shown in FIG. 3) detects from the second image a second block corresponding to a first block that is one of the plurality of blocks. A sorting unit (e.g., a sorting circuit 214 shown in FIG. 3) sorts pixels forming each of the first block and the second block in order according to pixel values. A difference data determining unit (e.g., a differential circuit 215 shown in FIG. 3) determines block difference data indicating the amount of change in the pixel values of the sorted pixels between the first block and the second block. An encoding unit (e.g., a block encoding circuit 216 shown in FIG. 3) encodes the block difference data.

The encoding apparatus further includes a noise-adding unit (e.g., an A/D converter 151 shown in FIG. 2 or a noise adder 291 shown in FIG. 19) that adds noise to the input image data.

In the encoding apparatus, the corresponding-block detecting unit includes the following elements. A candidate block extracting unit (e.g., a search-range-block forming circuit 233 shown in FIG. 3) extracts from the second image a plurality of candidate blocks that are candidates of the second block. A parameter determining unit (e.g., a parameter determining circuit 234 shown in FIG. 3) determines a parameter for each of the plurality of candidate blocks, the parameter indicating a feature value of pixels forming each candidate block. A block detecting unit (e.g., a corresponding-block extracting circuit 237 shown in FIG. 3) detects the second block corresponding to the first block from the plurality of candidate blocks on the basis of the parameter.

The encoding apparatus further includes an output unit (e.g., a data combining circuit 217 shown in FIG. 3) that outputs block information identifying the second block from the second image, sort-order information indicating a sort result of sorting the pixels forming the first block, and the block difference data encoded by the encoding unit.

According to an embodiment of the present invention, an encoding method for an encoding apparatus that encodes input image data including at least a first image and a second image includes the steps of dividing (e.g., the processing of step S1 shown in FIG. 13) the first image into a plurality of blocks; detecting (e.g., the processing of step S11 shown in FIG. 13) from the second image a second block corresponding to a first block that is one of the plurality of blocks; sorting (e.g., the processing of steps S5 and S13 shown in FIG. 13) pixels forming each of the first block and the second block in order according to pixel values; determining (e.g., the processing of step S15 shown in FIG. 13) block difference data indicating the amount of change in the pixel values of the sorted pixels between the first block and the second block; and encoding (e.g., the processing of step S16 shown in FIG. 13) the block difference data.

A program recorded on a recording medium according to an embodiment of the present invention includes specific steps corresponding to those of the encoding method described above.

A decoding apparatus according to an embodiment of the present invention includes the following elements. An obtaining unit (e.g., a data separating circuit 262 shown in FIG. 14) obtains a first minimum value, block information, sort-order information, and encoded block difference data. The first minimum value is a minimum value of pixel values of pixels forming a first block that is one of a plurality of blocks into which a first image is divided. The block information identifies a second block corresponding to the first block in a second image different from the first image. The sort-order information indicates a sort result of sorting the pixels forming the first block in order according to pixel differences, the pixel differences being differences between pixel values and a minimum pixel value of pixels forming each block. The encoded block difference data is obtained by encoding block difference data indicating the amount of change in the pixel differences for the sorted pixels between the first block and the second block. A block difference data decoding unit (e.g., a block decoding circuit 267 shown in FIG. 14) that decodes the encoded block difference data into the block difference data. A generating unit (e.g., a subtractor 266 and adders 268 and 269 shown in FIG. 14) generates pixel values of the pixels forming the first block using the block difference data decoded by the block difference data decoding unit, the pixel differences for the pixels forming the second block identified by the block information, and the first minimum value. A reverse-sorting unit (e.g., a reverse-sorting circuit 270 shown in FIG. 14) reverse-sorts the pixel values of the pixels forming the first block generated by the generating unit in a spatial phase prior to the sorting according to the sort-order information.

The decoding apparatus further includes a noise-adding unit (e.g., a D/A converter 156 shown in FIG. 2 or a noise adder 293 shown in FIG. 21) that adds noise to an output of the reverse-sorting unit.

A decoding method according to an embodiment of the present invention includes the steps of obtaining (e.g., the processing of step S41 shown in FIG. 15) a first minimum value, block information, sort-order information, and encoded block difference data, the first minimum value being a minimum value of pixel values of pixels forming a first block that is one of a plurality of blocks into which a first image is divided, the block information identifying a second block corresponding to the first block in a second image different from the first image, the sort-order information indicating a sort result of sorting the pixels forming the first block in order according to pixel differences, the pixel differences being differences between pixel values and a minimum pixel value of pixels forming each block, the encoded block difference data being obtained by encoding block difference data indicating the amount of change in the pixel differences for the sorted pixels between the first block and the second block; decoding (e.g., the processing of step S46 shown in FIG. 15) the encoded block difference data into the block difference data; generating (e.g., the processing of steps S42 through 47 shown in FIG. 15) pixel values of the pixels forming the first block using the block difference data decoded in the step of decoding, the pixel differences for the pixels forming the second block identified by the block information, and the first minimum value; and reverse-sorting (e.g., the processing of step S48 shown in FIG. 15) the pixel values of the pixels forming the first block generated in the step of generating in a spatial phase prior to the sorting according to the sort-order information.

A program recorded on a recording medium according to an embodiment of the present invention includes specific steps corresponding to those of the decoding method described above.

Embodiments of the present invention will be described hereinbelow with reference to the drawings.

Figure 2:
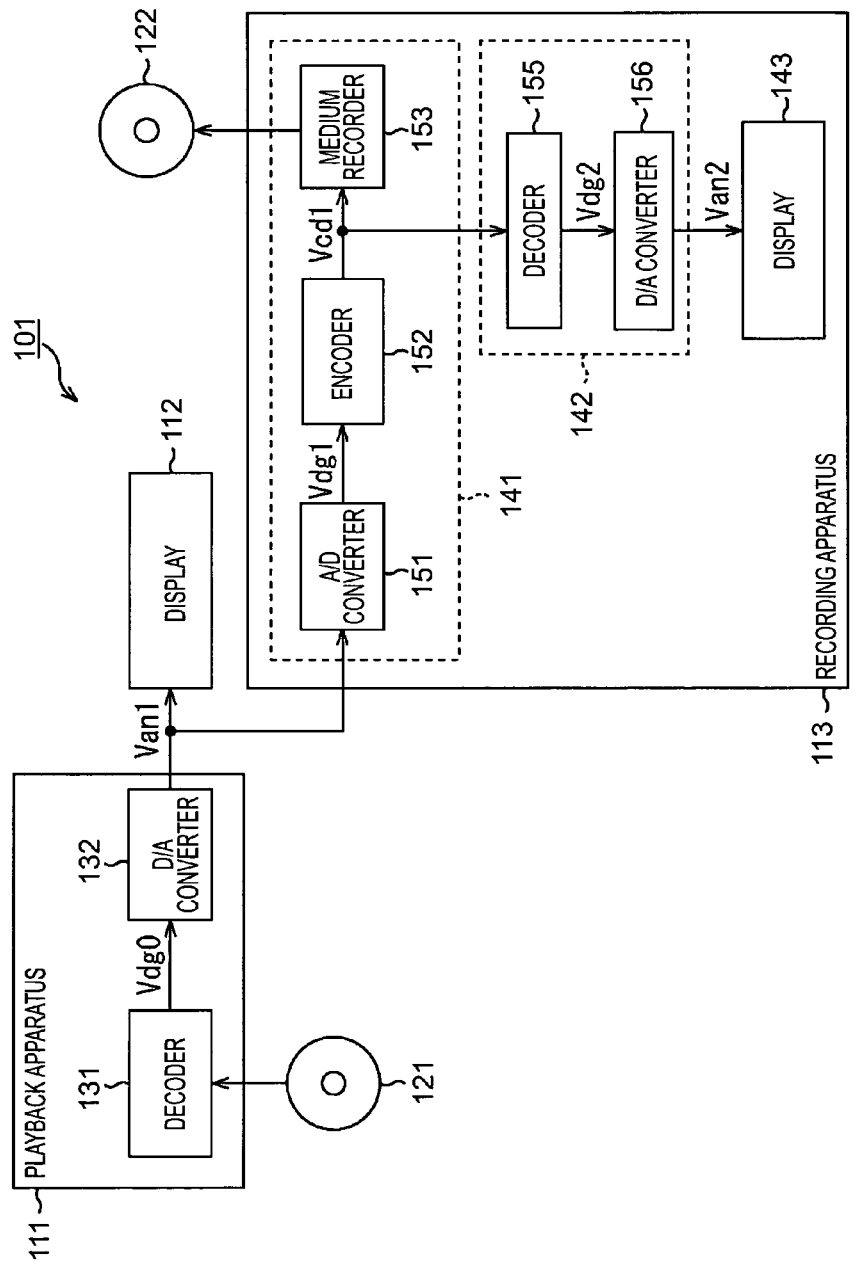
FIG. 2 is a block diagram showing an example structure of an image processing system according to an embodiment of the present invention.

FIG. 2 is a block diagram showing an example structure of an image processing system 101 according to an embodiment of the present invention.

In FIG. 2, the image processing system 101 includes a playback apparatus 111, a display 112, and a recording apparatus 113. The playback apparatus 111 plays back an image signal recorded on a recording medium 121, such as an optical disk, e.g., a DVD, and obtains an analog image signal Van1. The display 112 displays, as an image, the analog image signal Van1 output from the playback apparatus 111.

The recording apparatus 113 records an image signal onto a recording medium 122, such as an optical disk, using the analog image signal Van1 output from the playback apparatus 111.

The playback apparatus 111 includes a decoder 131 and a D/A converter 132. The decoder 131 decodes an encoded digital image signal read from the recording medium 121, and supplies the decoded digital image signal, namely, Vdg0, to the D/A converter 132. The D/A converter 132 converts the decoded digital image signal Vdg0 supplied from the decoder 131 into an analog image signal Van1, and outputs the analog image signal Van1.

The analog image signal Van1 output from the playback apparatus 111 (specifically, the D/A converter 132) involves a distortion of the signal that normally occurs when the decoded digital image signal Vdg0 is converted into an analog signal. This distortion is hereinafter referred to as an "analog distortion". Examples of the analog distortion include a distortion caused by removing the high-frequency components when the D/A converter 132 converts the decoded digital image signal Vdg0 into an analog signal, and a distortion caused by phase shifting induced when the D/A converter 132 converts the decoded digital image signal Vdg0 into an analog signal. Techniques for evaluating the degradation of the image (quality) due to the analog distortion include signal-to-noise (S/N) evaluation and visual evaluation (evaluation of the visual degradation).

The display 112 is composed of, for example, a CRT or an LCD. The display 112 displays an image corresponding to the analog image signal Van1 from the D/A converter 132, and allows the user to view the image corresponding to the image signal recorded on the recording medium 121.

The analog image signal Van1 (input image data) output from the playback apparatus 111 is also supplied (input) to the recording apparatus 113.

The recording apparatus 113 includes a recording unit 141 (an encoding apparatus), a playback unit 142 (a decoding apparatus), and a display 143. The recording unit 141 encodes the analog image signal Van1 from the playback apparatus 111, and records the encoded digital image signal, namely, Vcd1, onto the recording medium 122. The playback unit 142 plays back the encoded digital image signal Vcd1 to allow the user to confirm an image when the encoded digital image signal Vcd1 recorded on the recording medium 122 is decoded and displayed on the display 143. The display 143 displays the image played back by the playback unit 142.

The recording unit 141 includes an A/D converter 151, an encoder 152, and a medium recorder 153. The recording unit 141 converts the input analog image signal Van1 into a digital signal, encodes the digital signal, and records the encoded digital image signal, namely, Vcd1, onto the recording medium 122. Copying using the analog image signal Van1 from the playback apparatus 111 is thus performed.

The analog image signal Van1 output from the playback apparatus 111 is input to the A/D converter 151. The A/D converter 151 converts the input analog image signal Van1 into a digital image signal Vdg1, and supplies the digital image signal Vdg1 to the encoder 152.

The encoder 152 encodes the digital image signal Vdg1 from the A/D converter 151, and supplies the encoded digital image signal, namely, Vcd1, to the medium recorder 153 and the playback unit 142 (specifically, a decoder 155). The medium recorder 153 records the encoded digital image signal Vcd1 from the encoder 152 onto the recording medium 122.

As described above, the playback unit 142 is used to confirm an image when the encoded digital image signal Vcd1 recorded on the recording medium 122 is decoded by a certain playback apparatus (e.g., the playback apparatus 111) and is displayed on a display. Therefore, the playback unit 142 includes the decoder 155 and a D/A converter 156 with similar structures to the decoder 131 and the D/A converter 132 of the playback apparatus 111, respectively.

The decoder 155 decodes the encoded digital image signal Vcd1 from the encoder 152, and supplies the decoded digital image signal, namely, Vdg2, to the D/A converter 156. The D/A converter 156 converts the decoded digital image signal Vdg2 supplied from the decoder 155 into an analog image signal Van2, and outputs the analog image signal Van2 to the display 143.

The display 143 is composed of, for example, a CRT, an LCD, or the like. The display 143 displays an image corresponding to the analog image signal Van2 from the D/A converter 156, and allows the user to confirm (view) the image when the encoded digital image signal Vcd1 recorded on the recording medium 122 is played back.

The recording apparatus 113 records the encoded digital image signal Vcd1 onto the recording medium 122 using the analog image signal Van1 from the playback apparatus 111. The recording apparatus 113 also allows the user to confirm the image when the encoded digital image signal Vcd1 recorded on the recording medium 122 is played back by a certain playback apparatus (e.g., the playback apparatus 111) and is displayed on the display 112. The encoder 152 or the decoder 155 processes the digital image signal Vdg1 or the encoded digital image signal Vcd1 on a frame-by-frame basis.

In the image processing system 101 shown in FIG. 2, the image displayed on the display 112 (by means of the same analog image signal as the analog image signal Van2 output from the playback unit 142) when the playback apparatus 111 plays back the recording medium 122 on which the data is recorded (copied) by the recording apparatus 113 is degraded in quality (e.g., the S/N ratio) compared to the image displayed on the display 112 (by means of the analog image Van1) when the playback apparatus 111 plays back the recording medium 121, which is the copy source.

A more detailed description will be given of the encoder 152 and the decoder 155 that perform encoding and decoding when an image signal is copied using the analog image signal Van1 output from the playback apparatus 111 so that the image played back from the copied image signal can be degraded in quality.

Figure 3:
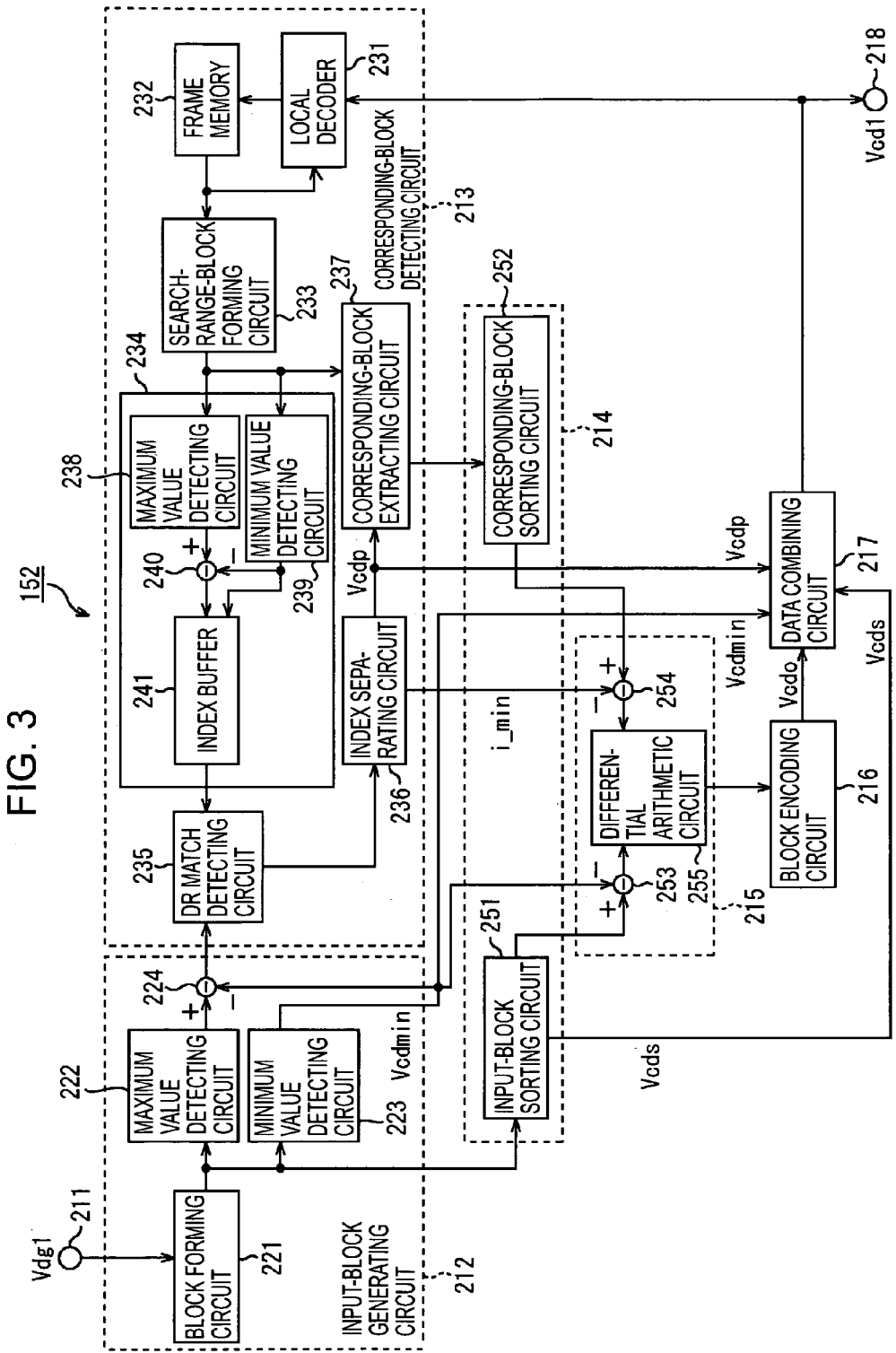
FIG. 3 is a block diagram showing an example detailed structure of an encoder 152 of the image processing system shown in FIG. 2.

FIG. 3 is a block diagram showing an example detailed structure of the encoder 152 of the recording apparatus 113 shown in FIG. 2.

The encoder 152 shown in FIG. 3 includes an input terminal 211, an input-block generating circuit 212, a corresponding-block detecting circuit 213, a sorting circuit 214, a differential circuit 215, a block encoding circuit 216, a data combining circuit 217, and an output terminal 218.

The digital image signal Vdg1 from the A/D converter 151 (see FIG. 2) is input to the input terminal 211, and is then supplied to the input-block generating circuit 212 (specifically, a block forming circuit 221).

The input-block generating circuit 212 includes the block forming circuit 221, a maximum value detecting circuit 222, a minimum value detecting circuit 223, and a subtractor 224. The input-block generating circuit 212 divides an image corresponding to the encoded digital image signal Vcd1 input on a frame-by-frame basis (this input image is hereinafter also referred to as an "input frame") into a plurality of blocks BL, and determines a dynamic range DR of each of the blocks BL.

In the encoder 152, the plurality of divided blocks BL are sequentially targeted for processing, and each target block BLc is processed.

The block forming circuit 221 divides the image of the input frame into a plurality of blocks BL, and supplies the blocks BL to the maximum value detecting circuit 222, the minimum value detecting circuit 223, and an input-block sorting circuit 251 of the sorting circuit 214. In this embodiment, for example, the size of each of the blocks BL is eight pixels in the horizontal direction by eight pixels in the vertical direction.

The maximum value detecting circuit 222 detects a maximum value Vcdmax of pixel values (input pixel values) of pixels constituting a target block BLc, and supplies the maximum value Vcdmax to the subtractor 224. The minimum value detecting circuit 223 detects a minimum value Vcdmin of the pixel values (input pixel values) of the pixels constituting the target block BLc, and supplies the minimum value Vcdmin to the subtractor 224, a subtractor 253 of the differential circuit 215, and the data combining circuit 217.

The subtractor 224 subtracts the minimum value Vcdmin from the maximum value Vcdmax of the pixel values to determine a dynamic range DR (=Vcdmax−Vcdmin) of the pixel values of the target block BLc (hereinafter referred to as "the dynamic range DR of the target block BLc", as needed), and supplies the dynamic range DR to a DR match detecting circuit 235 of the corresponding-block detecting circuit 213.

The corresponding-block detecting circuit 213 includes a local decoder 231, a frame memory 232, a search-range-block forming circuit 233, a parameter determining circuit 234, the DR match detecting circuit 235, an index separating circuit 236, and a corresponding-block extracting circuit 237. The corresponding-block detecting circuit 213 detects a corresponding block BLT to the target block BLc of the input frame generated by the input-block generating circuit 212 from the image of the frame previous to the input frame (hereinafter referred to as the "previous frame"). The parameter determining circuit 234 includes a maximum value detecting circuit 238, a minimum value detecting circuit 239, a subtractor 240, and an index buffer 241.

The local decoder 231 of the corresponding-block detecting circuit 213 locally decodes the encoded digital image signal Vcd1 supplied from the data combining circuit 217, and supplies the decoded signal to the frame memory 232 to update the frame memory 232. The local decoder 231 uses the image stored in the frame memory 232 as a reference image to locally decode the encoded digital image signal Vcd1. The encoded digital image signal Vcd1 of the current input frame is supplied to the local decoder 231 from the data combining unit 217 at a timing at which the next input frame is supplied to the input-block generating circuit 212 from the input terminal 211. Thus, the locally decoded image (reference image) to be supplied to (stored in) the frame memory 232 is an image of the frame previous to the image being processed by the input-block generating circuit 212 (that is, the previous frame).

The frame memory 232 stores the image of the previous frame supplied from the local decoder 231, and supplies it to the search-range-block forming circuit 233 and the local decoder 231.

The search-range-block forming circuit 233 extracts a plurality of candidate blocks $BP_i$ (i=1, 2, . . . ) from a predetermined search range of the image of the previous frame supplied from the frame memory 232. The candidate blocks $BP_i$ are possible candidates of the corresponding block BLT to the target block BLc of the input frame generated by the input-block generating circuit 212. The index i denotes a number identifying each of the plurality of candidate blocks BP.

The parameter determining circuit 234 determines parameters for each candidate block $BP_i$, indicating feature values of pixels constituting the candidate block $BP_i$.

Specifically, the maximum value detecting circuit 238 detects the maximum value of the pixel values of the pixels constituting the candidate block $BP_i$, and supplies the maximum value to the subtractor 240. The minimum value detecting circuit 239 detects the minimum value of the pixel values of the pixels constituting the candidate block $BP_i$, and supplies the minimum value to the subtractor 240 and the index buffer 241. The subtractor 240 subtracts the minimum value from the maximum value of the pixel values of the candidate block $BP_i$ to determine a dynamic range DR' of the pixel values, and supplies the dynamic range DR' to the index buffer 241. The index buffer 241 stores in a table the dynamic range DR' and the minimum value of the pixel values of the candidate block $BP_i$ supplied from the subtractor 240 and the minimum value detecting circuit 239, respectively, as parameters. The dynamic range DR' or the minimum value of the pixel values of the candidate block $BP_i$ is hereinafter referred to as "the dynamic range DR' or the minimum value of the candidate block $BP_i$".

After storing the dynamic ranges DR' and the minimum vales of all candidate blocks $BP_i$ of the previous frame, the index buffer 241 supplies them to the DR match detecting circuit 235.

The DR match detecting circuit 235 refers to the dynamic ranges DR' and the minimum values of all candidate blocks $BP_i$ supplied from the index buffer 241 to detect a candidate block $BP_i$ whose dynamic range DR' matches the dynamic range DR of the target block BLc supplied from the subtractor 224 of the input-block generating circuit 212. The detected candidate block $BP_i$ is rendered as the corresponding block BLT to the target block BLc of the input frame.

The DR match detecting circuit 235 supplies the index i and the minimum value, namely, i_min, of the detected candidate block $BP_i$ (the corresponding block BLT) to the index separating circuit 236. If the candidate block $BP_i$ having the same dynamic range as the dynamic range DR of the target block BLc is not detected, the DR match detecting circuit 235 detects, as the corresponding block BLT, a candidate block $BP_i$ having the minimum difference absolute value between the dynamic range DR' of the candidate block $BP_i$ and the dynamic range DR of the target block BLc. If a plurality of candidate blocks $BP_i$ of the corresponding block BLT are detected, for example, the first detected candidate block $BP_i$ may be rendered as the corresponding block BLT, or a candidate block $BP_i$ having the closest spatial phase (positional relationship within a frame) to that of the target block BLc may be rendered as the corresponding block BLT.

The index separating circuit 236 separates the index i and the minimum value i_min of the corresponding block BLT supplied from the DR match detecting circuit 235, and supplies the index i as index information Vcdp (block information identifying the corresponding block BLT) to the corresponding-block extracting circuit 237 and the data combining circuit 217. Further, the index separating circuit 236 supplies the minimum value i_min to a subtractor 254 of the differential circuit 215.

The corresponding-block extracting circuit 237 extracts (detects) the corresponding block BLT from the search-range-block forming circuit 233 based on the index information Vcdp from the index separating circuit 236, and supplies the corresponding block BLT to a corresponding-block sorting circuit 252 of the sorting circuit 214.

The sorting circuit 214 includes the input-block sorting circuit 251 and the corresponding-block sorting circuit 252. The sorting circuit 214 sorts the pixels constituting each of the target block BLc and the corresponding block BLT in order according to the pixel values.

Specifically, the input-block sorting circuit 251 sorts the pixels constituting the target block BLc in order according to the pixel values, and supplies the sorted pixels to the subtractor 253 of the differential circuit 215. The input-block sorting circuit 251 determines sort-order information Vcds (sort information Vcds indicating a sort result) indicating the locations of the pixels rearranged in the sort order with respect to the spatial phase prior to the rearrangement (hereinafter referred to as "the original spatial phase", as needed) (that is, in the raster order). The input-block sorting circuit 251 supplies the sort-order information Vcds to the data combining circuit 217.

The corresponding-block sorting circuit 252 sorts the pixels constituting the corresponding block BLT in order according to the pixel values, and supplies the sorted pixels to the subtractor 254 of the differential circuit 215. The corresponding-block sorting circuit 252 does not output (determine) the sort information Vcds of the corresponding block BLT.

The differential circuit 215 includes the subtractors 253 and 254 and a differential arithmetic circuit 255. The differential circuit 215 determines block difference data indicating the amount of change in the pixel differences for the sorted pixels between the target block BLc and the corresponding block BLT.

Specifically, the subtractor 253 or 254 determines pixel differences indicating differences between the pixel values of the pixels constituting the target block BLc or the corresponding block BLT and the minimum value of the pixel values of the pixels constituting each block. More specifically, the subtractor 253 subtracts the minimum value Vcdmin of the target block BLc supplied from the minimum value detecting circuit 223 from the pixel values of the sorted pixels constituting the target block BLc supplied from the input-block sorting circuit 251. That is, the subtractor 253 offsets the minimum value Vcdmin from the pixel values of the pixels constituting the target block BLc. Then, the subtractor 253 supplies the pixel differences to the differential arithmetic circuit 255. The subtractor 254 subtracts the minimum value i_min of the corresponding block BLT supplied from the index separating circuit 236 from the pixel values of the sorted pixels constituting the corresponding block BLT supplied from the corresponding-block sorting circuit 252. That is, the subtractor 254 offsets the minimum value i_min from the pixel values of the pixels constituting the corresponding block BLT. Then, the subtractor 254 supplies the pixel differences to the differential arithmetic circuit 255.

The differential arithmetic circuit 255 determines (calculates) differences for the (sorted) corresponding pixels between the pixel differences for the pixels constituting the target block BLc from the subtractor 253 and the pixel differences for the pixels constituting the corresponding block BLT from the subtractor 254 (that is, differences between the pixel differences of the target block BLc and the pixel differences of the corresponding block BLT). The differential arithmetic circuit 255 supplies the determined differences as block difference data to the block encoding circuit 216.

The block encoding circuit 216 encodes the block difference data determined by the differential circuit 215, and supplies the encoded data, namely, Vcdo, to the data combining circuit 217.

The data combining circuit 217 combines the minimum pixel value Vcdmin, the sort-order information Vcds, the index information Vcdp, and the encoded data Vcdo of each of the plurality of blocks BL constituting the frame, and supplies the resulting synthesis data as an encoded digital image signal Vcd1 to the local decoder 231 and the output terminal 218. The output terminal 218 outputs the encoded digital image signal Vcd1.

The operation of the encoder 152 will further be described with reference to FIGS. 4 to 12.

Figure 4:
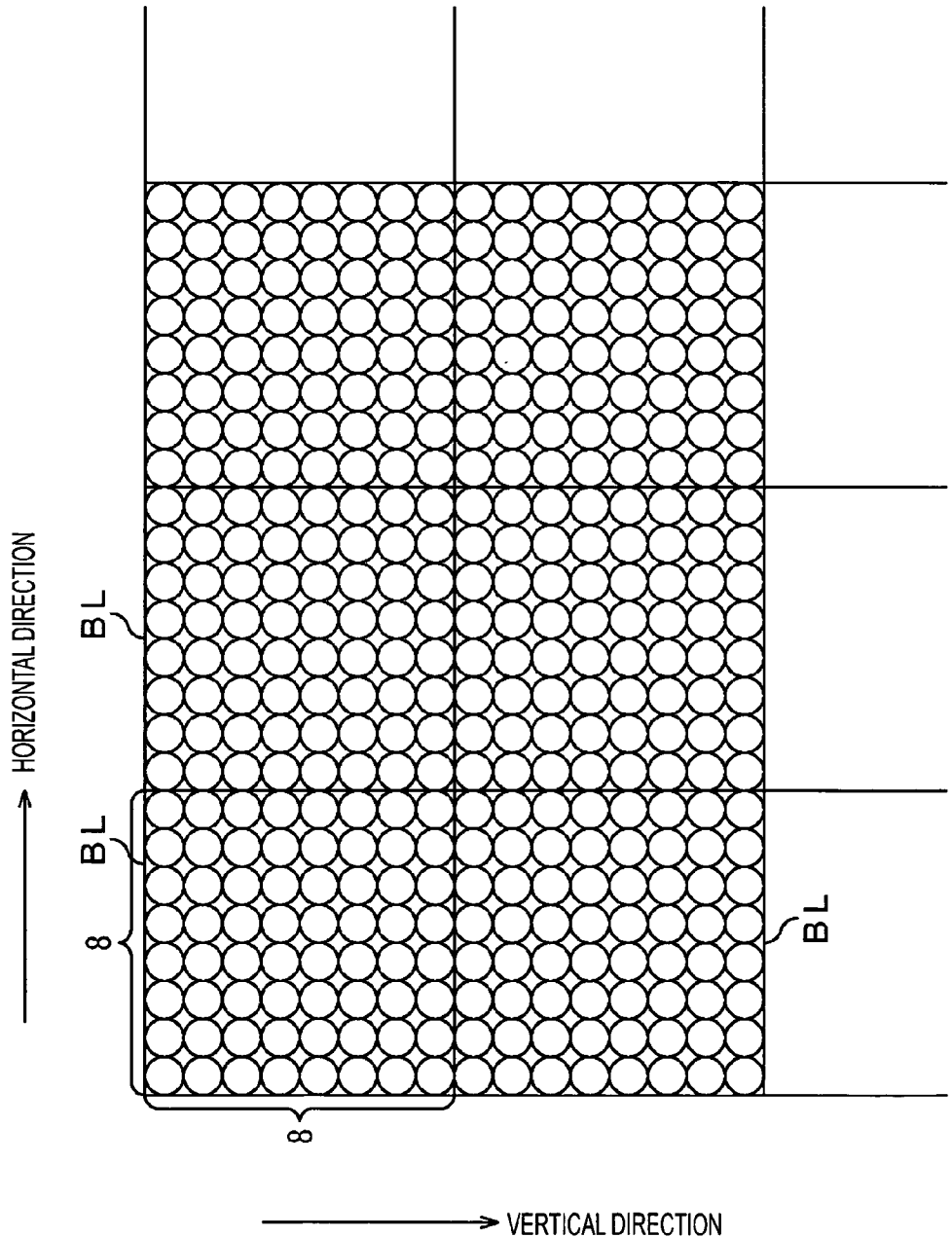
FIG. 4 is a diagram showing an operation of the encoder 152.

FIG. 4 shows an example of the plurality of blocks BL into which the image of the input frame is divided by the block forming circuit 221.

In the block forming circuit 221, for example, an image of an input frame having a predetermined number of pixels, e.g., 640 pixels by 480 pixels, is divided into a plurality of blocks BL each having 8 pixels by 8 pixels, as shown in FIG. 4. Each of the plurality of blocks BL is rendered as a target block BLc. In FIG. 4, pixels constituting an image are represented by circles.

Figure 5:
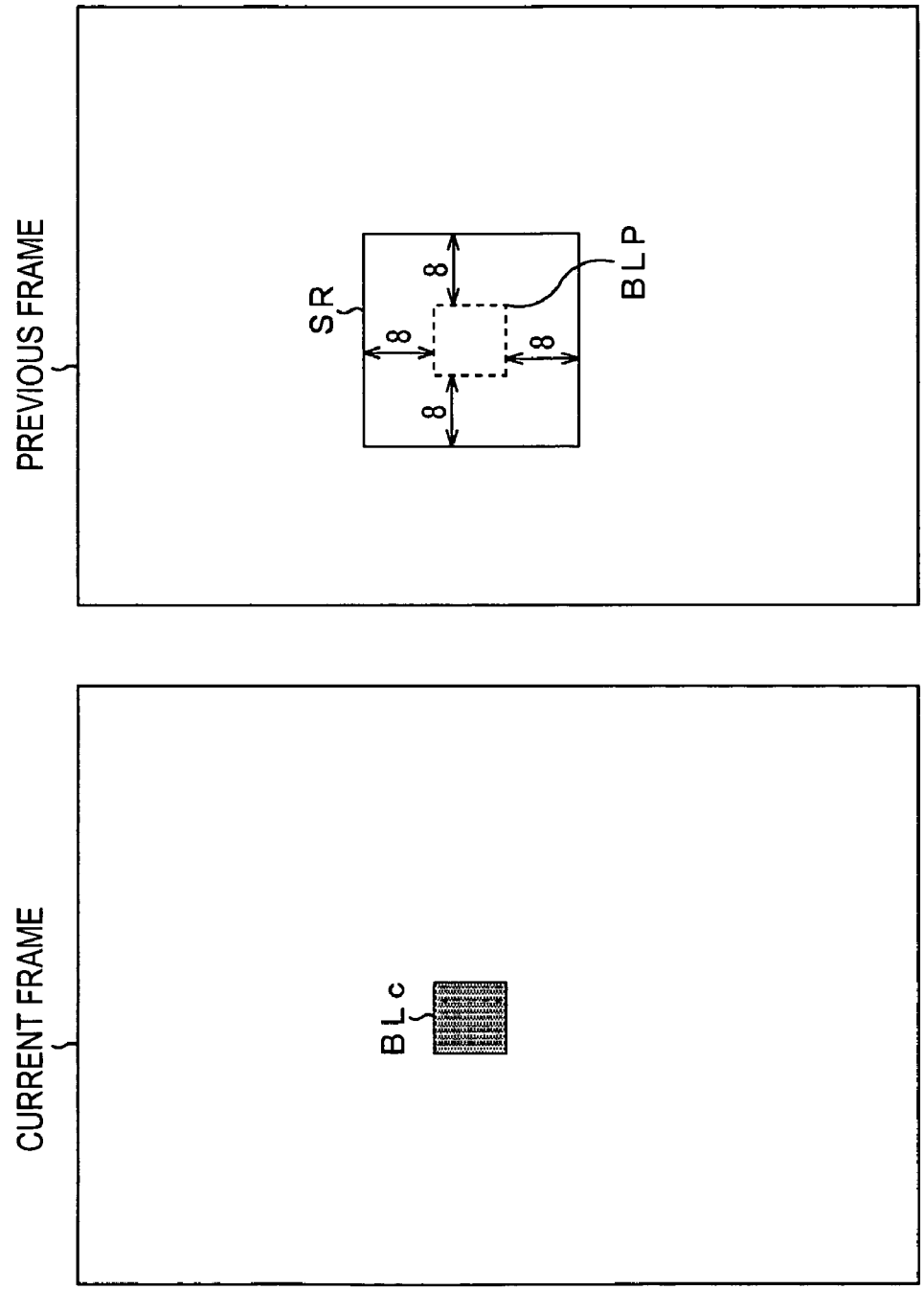
FIG. 5 is a diagram showing an operation of the encoder 152.

FIG. 5 shows a search range SR that is set by the search-range-block forming circuit 233 to extract a plurality of candidate blocks $BP_i$.

The search-range-block forming circuit 233 sets a search range SR based on a position BLP on the previous frame that is identical to the position of the target block BLc on the input frame (current frame). Referring to FIG. 5, the search range SR extends, for example, eight pixels to the right and eight pixels to the left (i.e., 16 pixels in the horizontal direction) and eight pixels to the up and eight pixels to the down (i.e., 16 pixels in the vertical direction) with respect to the position BLP on the previous frame.

Figure 6:
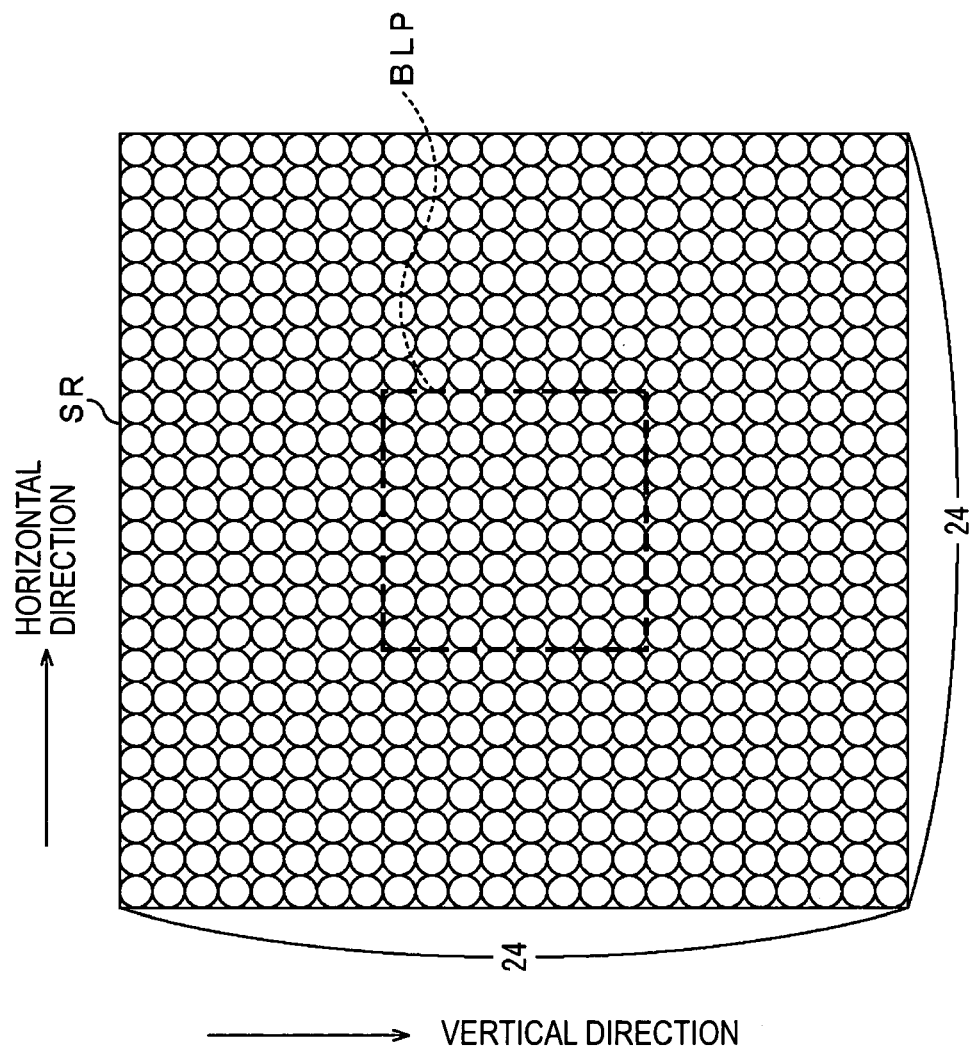
FIG. 6 is a diagram showing an operation of the encoder 152.

Therefore, as shown in FIG. 6, the search range SR extends over an area having 24 pixels in the horizontal direction and 24 pixels in the vertical direction, which is centered around the position BLP on the previous frame.

The search-range-block forming circuit 233 extracts sets of pixels of all blocks that can be taken in the search range SR shown in FIG. 6 and that has the same size as the target block BLc as candidate blocks $BP_i$.

Figure 7:
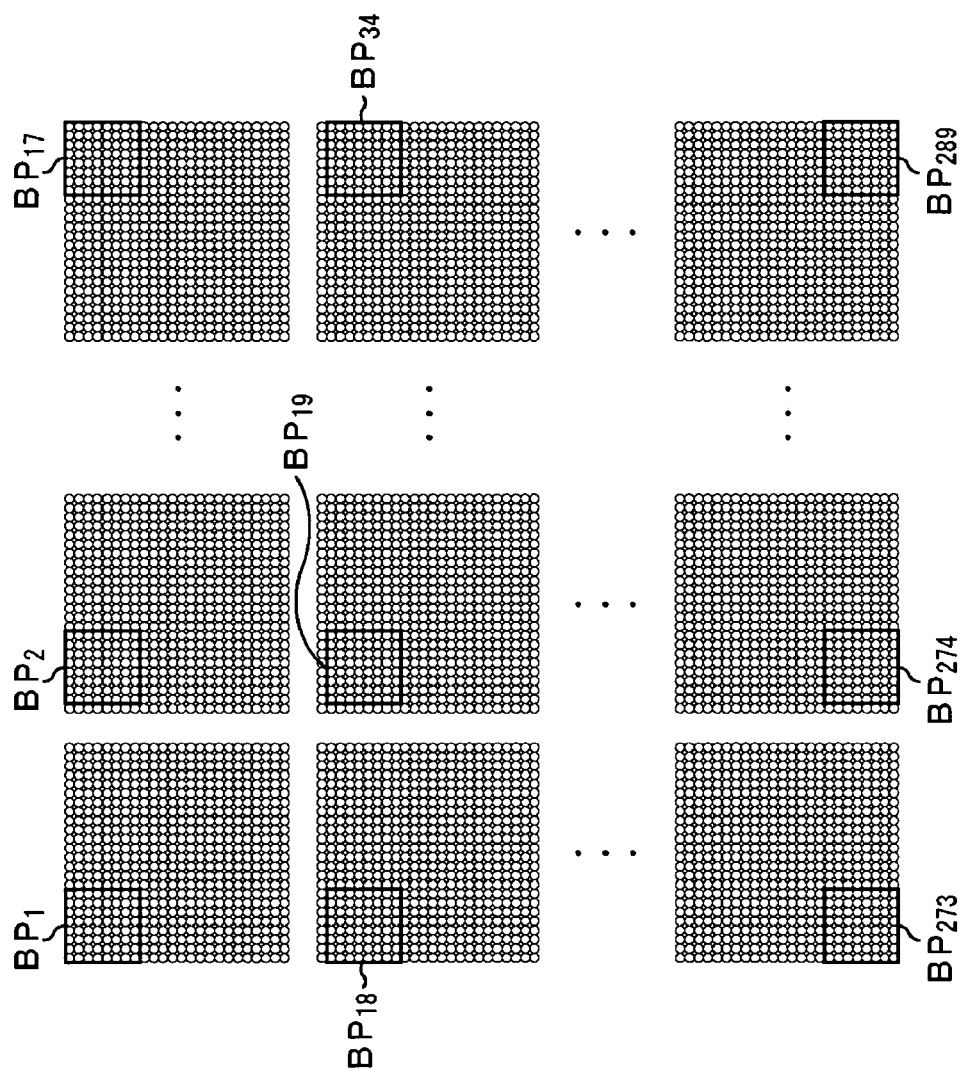
FIG. 7 is a diagram showing an operation of the encoder 152.

Referring to FIG. 7, the search-range-block forming circuit 233 extracts a block of 8×8 pixels=64 pixels including the upper-leftmost pixel in the search range SR as a candidate block $BP_1$. The search-range-block forming circuit 233 further extracts candidate blocks $BP_2$ to $BP_{17}$ by shifting one to 16 pixels to the right (in the horizontal direction) with respect to the candidate block $BP_1$, and extracts candidate blocks $BP_{18}$ to $BP_{289}$ by shifting one to 16 pixels to the down (in the vertical direction) with respect to the candidate blocks $BP_1$ to $BP_{17}$.

The search-range-block forming circuit 233 thus extracts 289 candidate blocks $BP_1$ to $BP_{289}$.

The parameter determining circuit 234 determines parameters indicating feature values of pixels constituting each candidate block $BP_i$ (i.e., the minimum pixel values and the dynamic ranges DR') for each of the plurality of candidate blocks $BP_i$ (i=1, 2, . . . , 289), and stores the parameters in the index buffer 241.

FIG. 8 shows an exemplary table stored in the index buffer 241, including the dynamic ranges DR' and the minimum values of the candidate blocks $BP_i$.

Referring to FIG. 8, the index buffer 241 stores the candidate blocks $BP_i$ in association with the dynamic ranges DR' and the minimum values of the candidate blocks $BP_i$. The index buffer 241 supplies all sets of the dynamic ranges DR' and the minimum values of the candidate blocks $BP_i$ shown in FIG. 8 to the DR match detecting circuit 235.

The DR match detecting circuit 235 refers to the dynamic ranges DR' in all sets of the dynamic ranges DR' and minimum values of the candidate blocks $BP_i$ supplied from the index buffer 241 to detect a candidate block $BP_i$ whose dynamic range DR' matches the dynamic range DR of the target block BLc. The DR match detecting circuit 235 supplies the index i and the minimum value i_min of the detected candidate block $BP_i$ to the index separating circuit 236.

Figure 9:
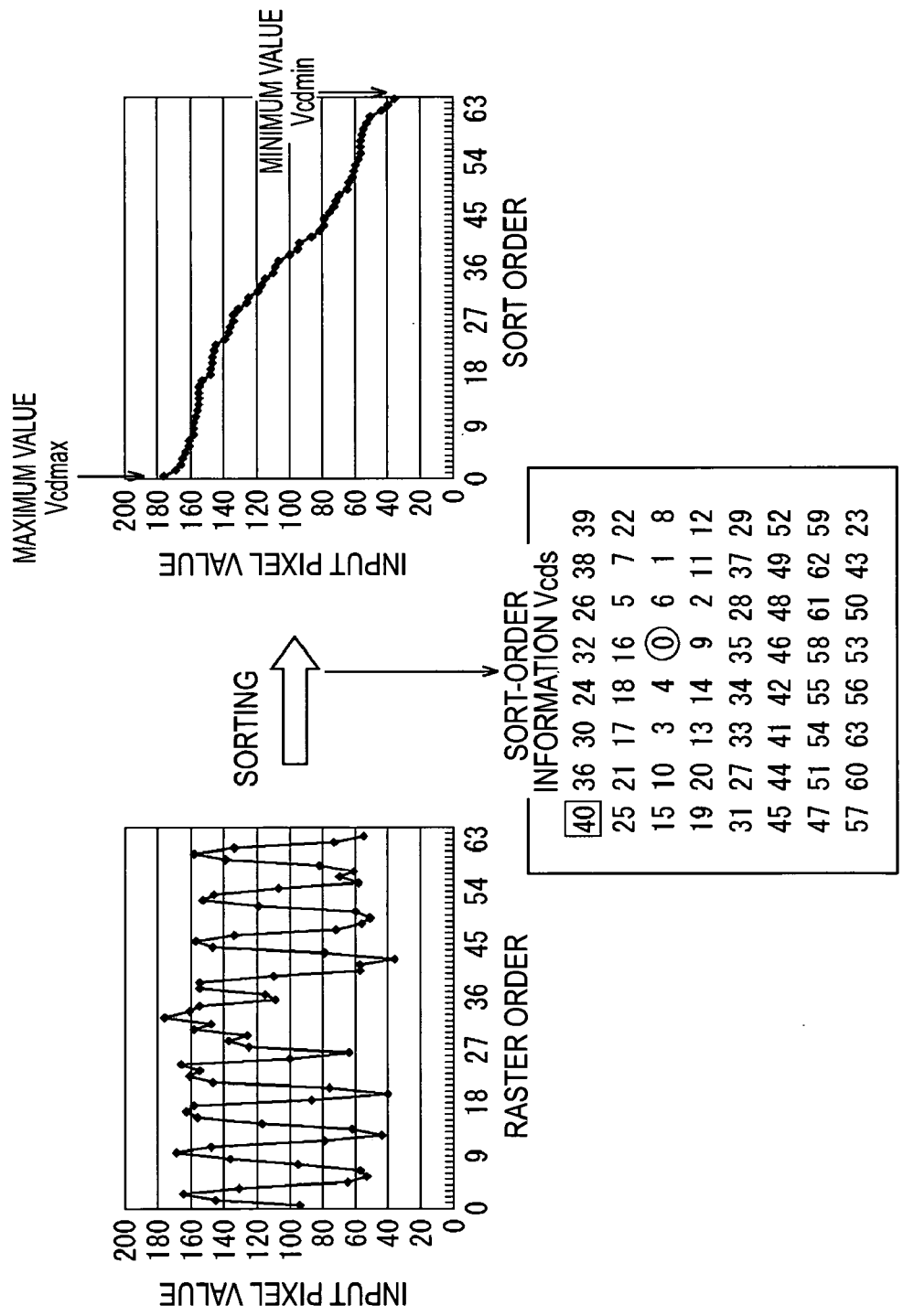
FIG. 9 is a diagram showing an operation of the encoder 152.
Figure 10:
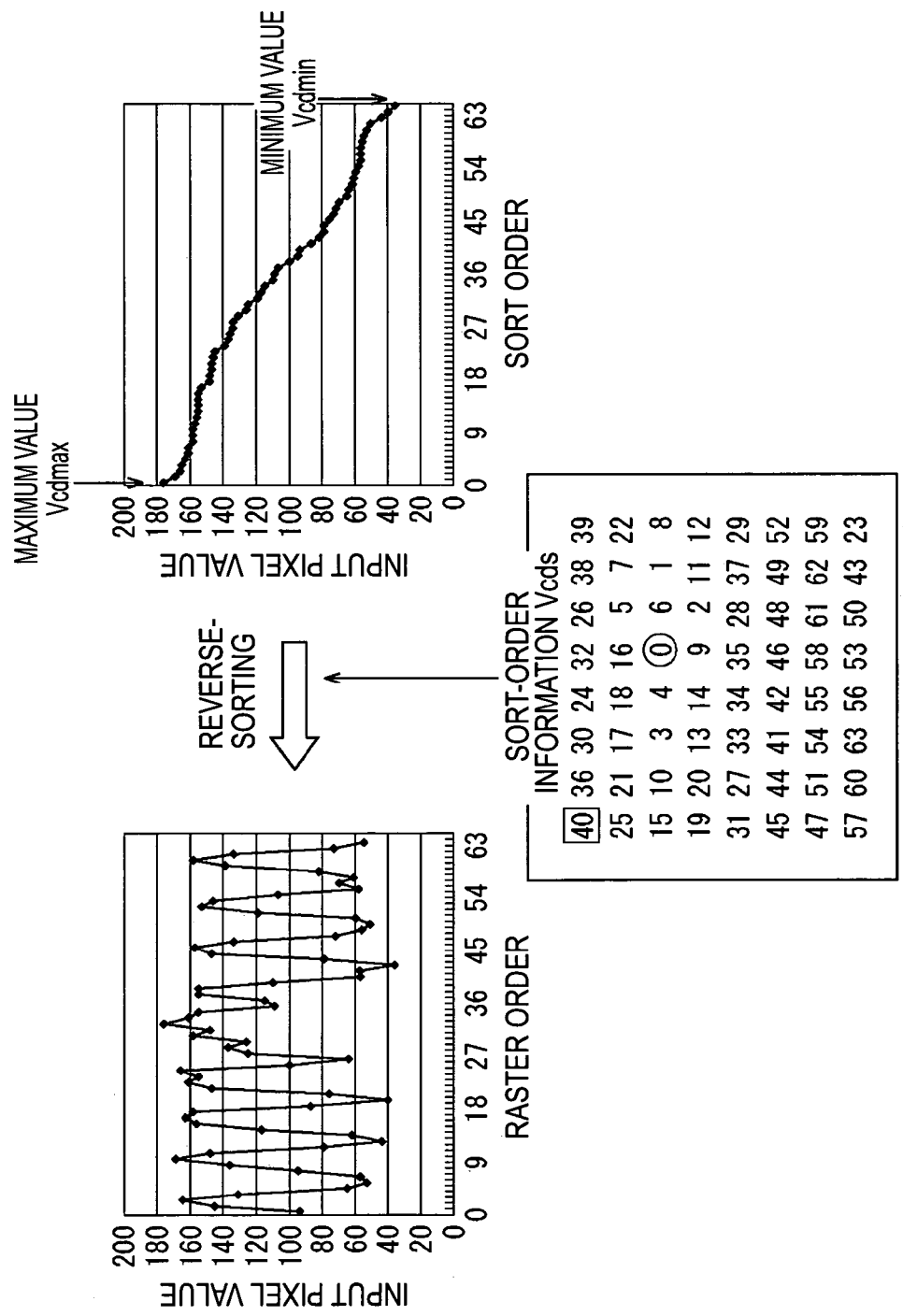
FIG. 10 is a diagram showing an operation of the encoder 152.

FIGS. 9 and 10 show the sort-order information Vcds determined by the input-block sorting circuit 251.

The target block BLc in which the pixels are arranged in the raster order is supplied to the input-block sorting circuit 251 from the block forming circuit 221. In the left graph shown in FIG. 9, the pixel values of the pixels constituting the target block BLc are plotted with the x-axis indicating raster order numbers from 0 to 63 representing the locations of the pixels and the y-axis indicating the input pixel values of the pixels.

The input-block sorting circuit 251 rearranges (sorts) the pixels constituting the target block BLc in the descending order from the largest input pixel value. Thus, as can be seen from the right graph shown in FIG. 9 with the x-axis indicating sort order numbers from 0 to 63, the input pixel value assigned sort order number 0 is the maximum value Vcdmax of the input pixel values of the target block BLc, which is equivalent to the value detected by the maximum value detecting circuit 222 of the input-block generating circuit 212, and the input pixel value assigned sort order number 63 is the minimum value Vcdmin of the input pixel values of the target block BLc, which is equivalent to the value detected by the minimum value detecting circuit 223 of the input-block generating circuit 212.

The input-block sorting circuit 251 determines the sort-order information Vcds indicating the locations of the pixels rearranged in the sort order with respect to the spatial phase prior to the rearrangement (i.e., in the raster order). In the sort-order information Vcds shown in FIG. 9, the numbers of the sorted pixels (the sort order numbers) are stored at the positions of the raster order numbers of the pixels constituting the target block BLc.

For example, the pixel located at the upper left corner of the target block BLc, which is surrounded by a square in the sort-order information Vcds shown in FIG. 9, is associated with sort order number 40. That is, the sort order number of the pixel located at the same position in the original spatial phase is 40. The pixel shifted four pixels to the right and two pixels to the down with respect to the pixel at the upper left corner of the target block BLc, which is surrounded by a circle in the sort-order information Vcds shown in FIG. 9, is associated with sort order number 0. That is, the sort order number of the pixel located at the same position in the original spatial phase is 0. The pixel surrounded by the circle is therefore a pixel having the maximum value Vcdmax of the pixel values of the pixels constituting the target block BLc.

As shown in FIG. 10, the sort-order information Vcds is used to return the pixels constituting the target block BLc that are rearranged in the sort order to those having the original spatial phase (raster order).

The sorted pixels of the target block BLc shown in the right graph of FIG. 9 are supplied to the subtractor 253 of the differential circuit 215, and the subtractor 253 subtracts the minimum value Vcdmin of the target block BLc. The waveform after the sorting, shown in the right graph of FIG. 9, is offset downwards by the minimum value Vcdmin, thereby obtaining a pixel-difference waveform of the target block BLc after the sorting, shown in the upper left graph of FIG. 11. In the pixel-difference waveform shown in the upper left graph of FIG. 11, the minimum pixel value (after the offsetting) is zero.

The subtractor 254 of the differential circuit 215 performs similar processing to that of the target block BLc on the corresponding block BLT to offset the minimum value i_min of the corresponding block BLT from the sorted pixels of the corresponding block BLT. Thus, a pixel-difference waveform of the corresponding block BLT after the sorting, shown in the upper right graph of FIG. 11, is obtained.

Figure 11:
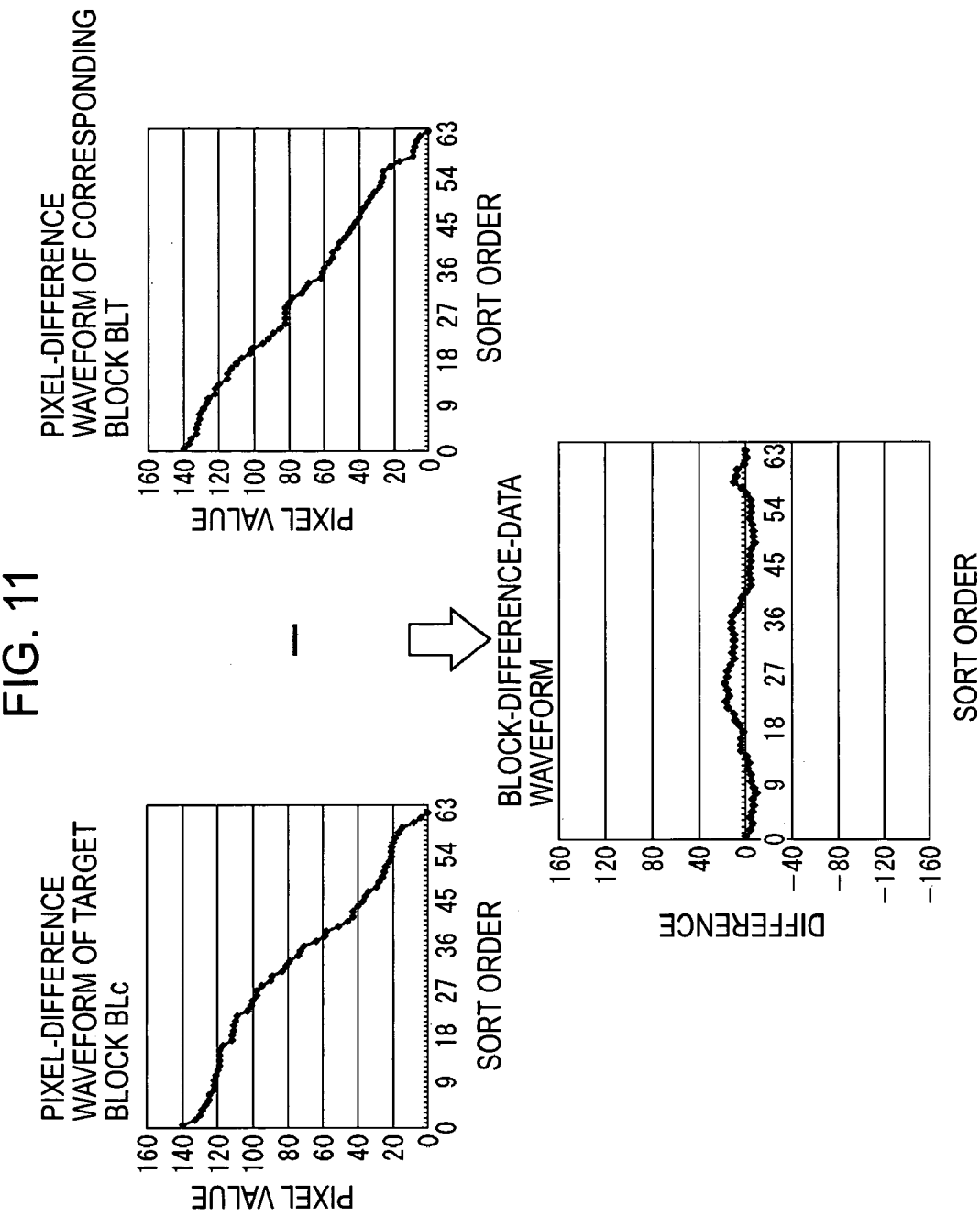
FIG. 11 is a diagram showing an operation of the encoder 152.

The differential arithmetic circuit 255 determines differences for the (sorted) corresponding pixels between the pixel-difference waveform of the target block BLc and the pixel-difference waveform of the corresponding block BLT, thereby obtaining a block-difference-data waveform shown in the lower graph of FIG. 11. In the lower graph of FIG. 11, the block-difference-data waveform in which the differences for the corresponding pixels between the pixel-difference waveform of the target block BLc and the pixel-difference waveform of the corresponding block BLT are determined is illustrated.

In the pixel-difference waveforms shown in FIG. 11, the dynamic range DR of the target block BLc and the dynamic range DR' of the corresponding block BLT match each other. When the dynamic range DR of the target block BLc and the dynamic range DR' of the corresponding block BLT match each other, the minimum value Vcdmin and the minimum value i_min are offset from the pixel values of the pixels of the target block BLc and the pixel values of the pixels of the corresponding block BLT, respectively. In the block-difference-data waveform representing the differences for the corresponding pixels between the pixel-difference waveform of the target block BLc and the pixel-difference waveform of the corresponding block BLT, therefore, the differences (difference values) between the pixels of sort order number 0 and between the pixels of sort order number 63 are zero.

The block encoding circuit 216 performs a discrete sine transform (DST) on the block-difference-data waveform (shown in the lower graph of FIG. 11) supplied from the differential arithmetic circuit 255 to determine DST coefficients.

Figure 12:
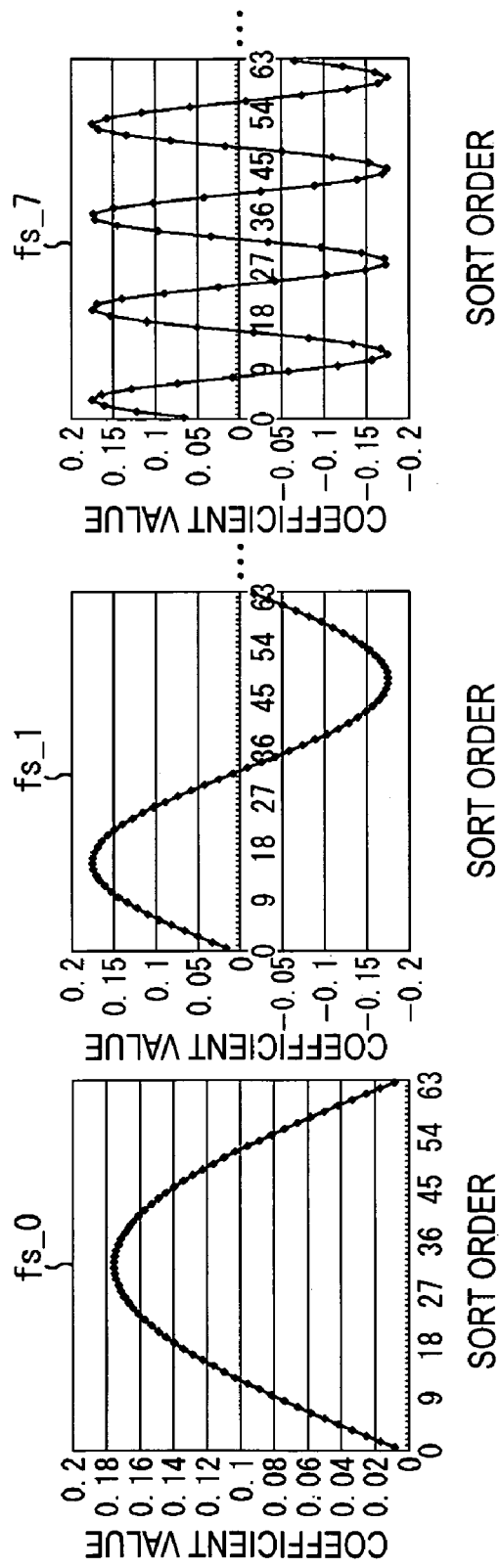
FIG. 12 is a diagram showing an operation of the encoder 152.

The DST is an orthogonal transform in which the block-difference-data waveform is represented by superimposing sine basis functions (sine waveforms) fs_j (j=0, 1, 63) shown in FIG. 12. The sine basis function fs_j is given by the following equation:

$$\text{fs\_j} = \sin\left(\frac{(k+1)\times(j+1)\times\pi}{N+1}\right) \times \sqrt{\frac{2}{N+1}} \quad \text{Eq. (1)}$$

where k (k=0, 1, ..., 63) denotes the sort order number (the position of the target block BLc arranged in the sort order), j (j=0, 1, ..., 63) denotes the basis number identifying the basis function fs_j, and N denotes the number of pixels of the target block BLc (namely, 64).

As shown in FIG. 12, the smaller the basis number j, the lower the frequency component the sine basis function fs_j represents.

The block encoding circuit 216 may perform any orthogonal transform other than the DST, such as a discrete cosine transform (DCT), on the block-difference-data waveform. However, when the dynamic ranges of the target block BLc and the corresponding block BLT match each other, as shown in FIG. 11, the differences (difference values) at both ends, i.e., sort order number 0 and sort order number 63, are zero, and, preferably, the DST is performed because the characteristic of the zero differences can be better represented.

Then, the block encoding circuit 216 quantizes the DST coefficients determined by performing the DST. The quantization may be performed by dividing all DST coefficients by an identical value or by dividing the DST coefficients of the high-frequency components by a value greater than the value by which the DST coefficients of the low-frequency components are divided so that the high-frequency components can be removed.

Further, the block encoding circuit 216 performs entropy encoding (variable-length encoding) on the quantized DST coefficients using, for example, Huffman codes, and supplies the resulting encoded data Vcdo to the data combining circuit 217.

Figure 13:
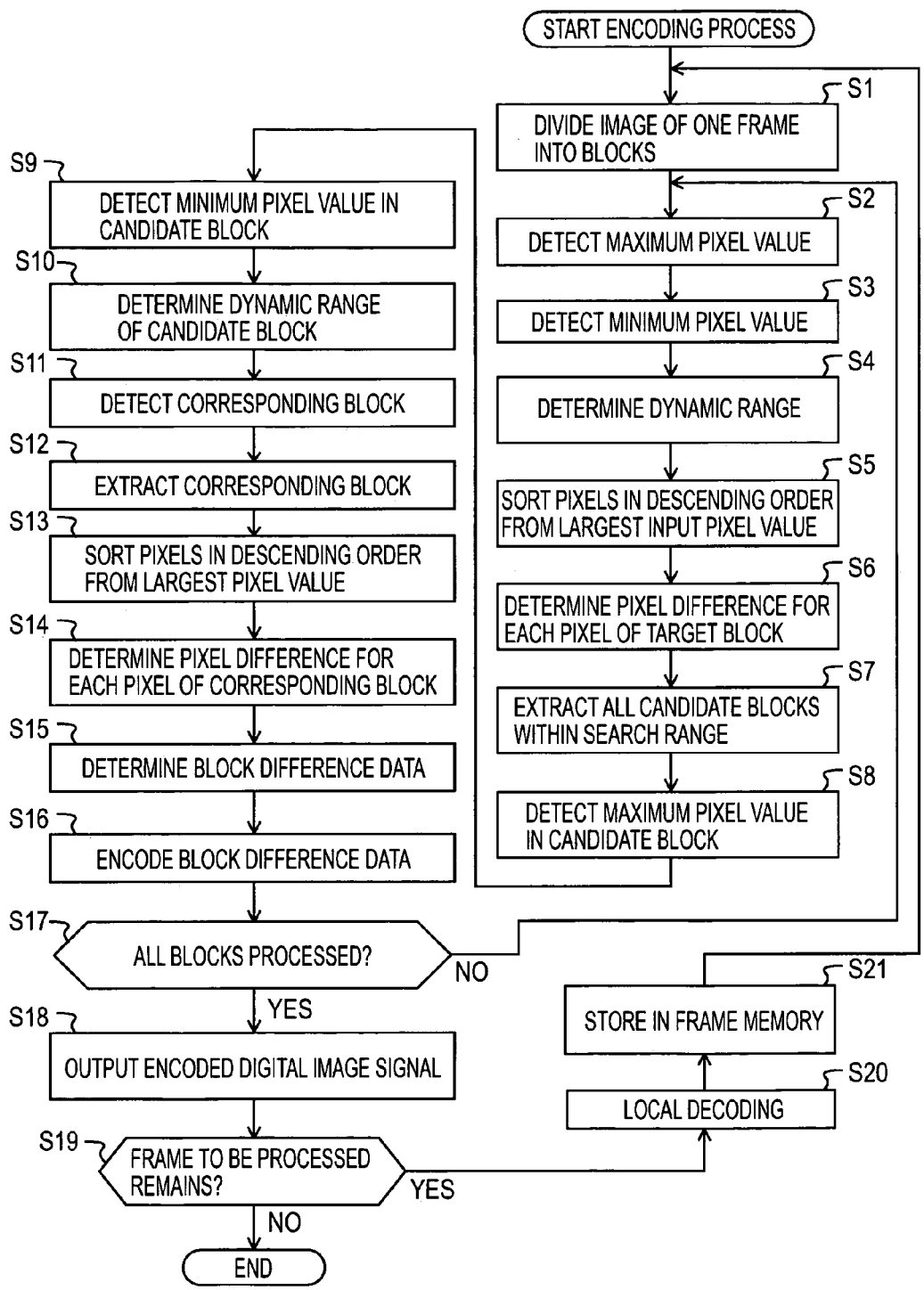
FIG. 13 is a flowchart showing an encoding process.

The encoding operation of the encoder 152 shown in FIG. 3 will be described below with reference to a flowchart shown in FIG. 13.

First, in step S1, the block forming circuit 221 divides an image of each frame corresponding to the digital image signal Vdg1 supplied from the A/D converter 151 via the input terminal 211 into a plurality of blocks BL each having 8 pixels by 8 pixels, and supplies the divided blocks BL to the maximum value detecting circuit 222, the minimum value detecting circuit 223, and the input-block sorting circuit 251.

In step S2, one of the plurality of divided blocks BL is rendered as a target block BLc. In step S2, the maximum value detecting circuit 222 detects the maximum value Vcdmax of pixel values of pixels constituting the target block BLc, and supplies the maximum value Vcdmax to the subtractor 224.

In step S3, the minimum value detecting circuit 223 detects the minimum value Vcdmin of the pixel values of the pixels constituting the target block BLc, and supplies the minimum value Vcdmin to the subtractor 224, the subtractor 253 of the differential circuit 215, and the data combining circuit 217.

In step S4, the subtractor 224 determines the dynamic range DR of the target block BLc, and supplies it to the DR match detecting circuit 235 of the corresponding-block detecting circuit 213.

In step S5, the input-block sorting circuit 251 sorts the pixels constituting the target block BLc in the descending order from the largest pixel value. The input-block sorting circuit 251 supplies the sorted pixels constituting the target block BLc to the subtractor 253 of the differential circuit 215, and also supplies the sort information Vcds of the target block BLc to the data combining circuit 217.

In step S6, the subtractor 253 of the differential circuit 215 determines pixel differences for the pixels constituting the target block BLc. Specifically, the subtractor 253 subtracts the minimum value Vcdmin of the target block BLc from the pixel values of the sorted pixels constituting the target block BLc (that is, the subtractor 253 offsets the minimum value Vcdmin from the pixel values of the pixels constituting the target block BLc). The subtractor 253 supplies the resulting values to the differential arithmetic circuit 255.

In step S7, the search-range-block forming circuit 233 extracts all candidate blocks $BP_i$ that are possible candidates of the corresponding block BLT to the target block BLc from a predetermined search range in the image of the previous frame supplied from the frame memory 232.

In step S8, the maximum value detecting circuit 238 of the parameter determining circuit 234 detects the maximum value of the pixel values of the pixels constituting each of the candidate blocks $BP_i$, and supplies the maximum values to the subtractor 240.

In step S9, the minimum value detecting circuit 239 detects the minimum value of the pixel values of the pixels constituting each of the candidate blocks $BP_j$, and supplies the minimum values to the subtractor 240 and the index buffer 241.

In step S10, the subtractor 240 determines the dynamic range DR' of each of the candidate blocks $BP_j$, and supplies the dynamic ranges DR' to the index buffer 241.

In step S11, the DR match detecting circuit 235 detects a candidate block $BP_i$ (the corresponding block BLT) whose dynamic range DR' matches the dynamic range DR of the target block BLc supplied from the subtractor 224 of the input-block generating circuit 212 from all candidate blocks $BP_i$ supplied from the index buffer 241. If a plurality of candidate blocks $BP_i$ are detected, for example, the first detected candidate block $BP_i$ is rendered as the corresponding block BLT.

In step S11, further, the DR match detecting circuit 235 supplies the index i and the minimum value i_min of the detected corresponding block BLT to the index separating circuit 236.

In step S12, the corresponding-block extracting circuit 237 extracts the corresponding block BLT from the candidate blocks $BP_i$ extracted by the search-range-block forming circuit 233 based on the index information Vcdp from the index separating circuit 236, and supplies the extracted corresponding block BLT to the corresponding-block sorting circuit 252 of the sorting circuit 214.

In step S13, the corresponding-block sorting circuit 252 sorts the pixels constituting the corresponding block BLT in the descending order from the largest pixel value, and supplies the sorted pixels to the subtractor 254 of the differential circuit 215.

In step S14, the subtractor 254 determines pixel differences for the pixels constituting the corresponding block BLT. Specifically, the subtractor 254 subtracts the minimum value i_min of the corresponding block BLT from the pixel values of the sorted pixels constituting the corresponding block BLT (that is, the subtractor 254 offsets the minimum value i_min from the pixel values of the pixels constituting the corresponding block BLT). Then, the subtractor 254 supplies the resulting values to the differential arithmetic circuit 255.

In step S15, the differential arithmetic circuit 255 determines the block difference data between the target block BLc and the corresponding block BLT, and supplies it to the block encoding circuit 216. Specifically, the differential arithmetic circuit 255 determines differences for the (sorted) corresponding pixels between the pixel differences of the target block BLc from the subtractor 253 and the pixel differences of the corresponding block BLT from the subtractor 254, and supplies the differences to the block encoding circuit 216.

In step S16, the block encoding circuit 216 encodes the block difference data determined by the differential circuit 215, and supplies the resulting encoded data Vcdo to the data combining circuit 217.

In step S17, the data combining circuit 217 determines whether or not all blocks BL constituting the image of the frame have been processed, that is, whether or not each of the blocks BL of the image of the frame has been targeted as the target block BLc for the processing of steps S2 through S16 described above.

If it is determined in step S17 that all blocks BL have not been processed, the flow returns to step S2, and an unprocessed block BL is rendered as the target block BLc. The processing of steps S2 through S17 is repeatedly performed on the target block BLc.

If it is determined in step S17 that all blocks BL have been processed, then, in step S18, the data combining circuit 217 combines the minimum pixel value Vcdmin, the sort-order information Vcds, the index information Vcdp, and the encoded data Vcdo of each of the plurality of blocks BL constituting the frame, and supplies (outputs) the resulting encoded digital image signal Vcd1 to the local decoder 231 and the output terminal 218.

After the processing of step S18, then, in step S19, the encoder 152 determines whether or not there remains an image of a frame to be processed, that is, whether or not an image of a frame to be subsequently processed has been supplied from the A/D converter 151.

If it is determined in step S19 that there remains an image of a frame to be processed, then, in step S20, the local decoder 231 locally decodes the encoded digital image signal Vcd1 to generate a reference image. Then, in step S21, the local decoder 231 stores the reference image in the frame memory 232. Then, the flow returns to step S1.

If it is determined in step S19 that an image of a frame to be processed does not remain, that is, if an image of a frame to be subsequently processed is not supplied from the A/D converter 151, the process ends.

In the encoding operation of the encoder 152, therefore, an image of each input frame is divided into a plurality of blocks BL, and each of the blocks BL is rendered as a target block BLc. The input-block generating circuit 212 determines the dynamic range DR of the target block BLc. The corresponding-block detecting circuit 213 detects the corresponding block BLT to the target block BLc from the image of the previous frame.

In each of the target block BLc and the corresponding block BLT, the pixels are sorted in order according to the pixel values (e.g., in the descending order from the largest pixel value). The block difference data between the target block BLc and the corresponding block BLT is determined and encoded.

If the image of the frame corresponding to the input digital image signal Vdg1 is the image of the top (first) frame, in the encoder 152, the encoded data Vcdo that is encoded so that no encoding distortion occurs is combined with the other data by the data combining circuit 217, and the synthesis data is output as the encoded digital image signal Vcd1.

Figure 14:
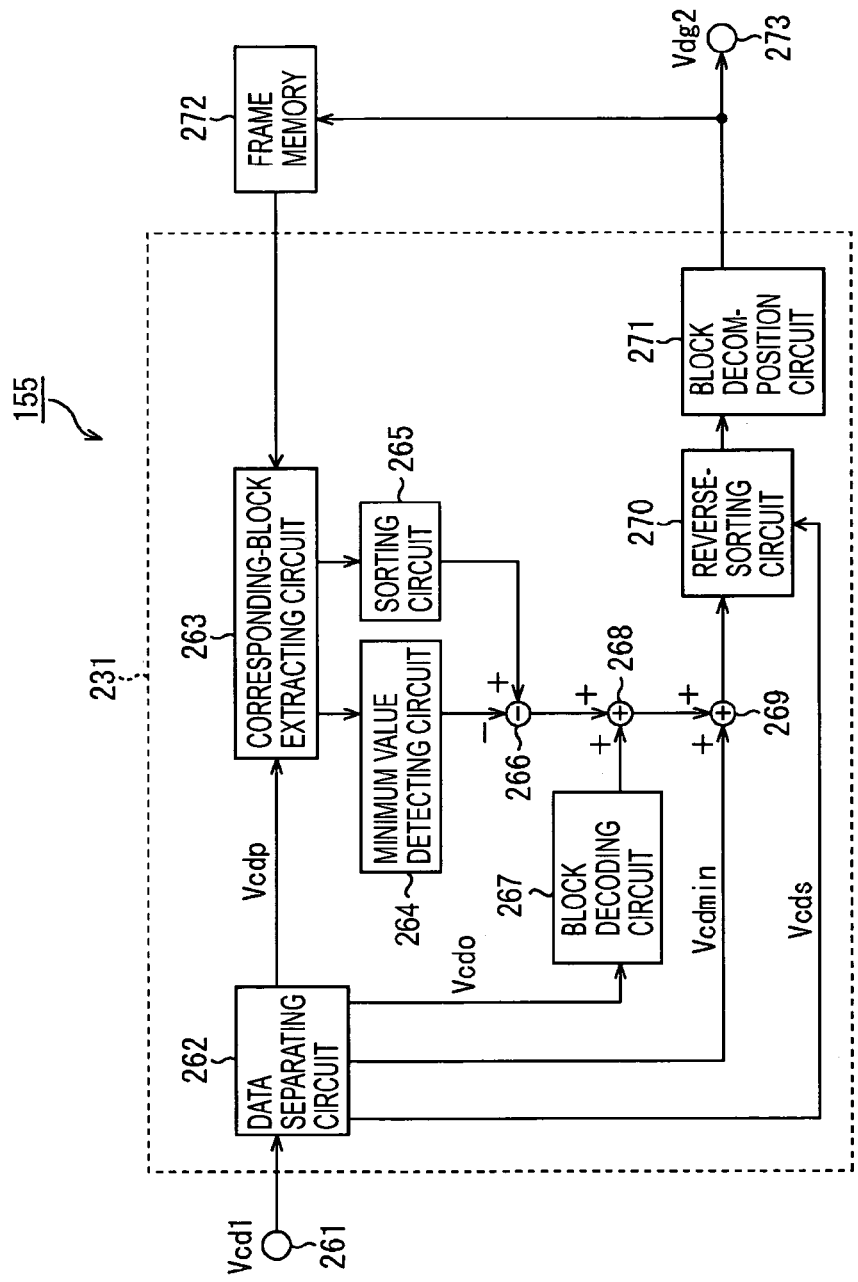
FIG. 14 is a block diagram showing an example detailed structure of a decoder 155 of the image processing system shown in FIG. 2.

FIG. 14 is a block diagram showing an example detailed structure of the decoder 155 of the recording apparatus 113 shown in FIG. 2.

The decoder 155 shown in FIG. 14 includes an input terminal 261, a data separating circuit 262, a corresponding-block extracting circuit 263, a minimum value detecting circuit 264, a sorting circuit 265, a subtractor 266, a block decoding circuit 267, adders 268 and 269, a reverse-sorting circuit 270, a block decomposition circuit 271, a frame memory 272, and an output terminal 273.

The encoded digital image signal Vcd1 is supplied (input) to the data separating circuit 262 from the encoder 152 via the input terminal 261.

The data separating circuit 262 separates the encoded digital image signal Vcd1 into the minimum pixel value Vcdmin, the sort-order information Vcds, the index information Vcdp identifying the corresponding block BLT, and the encoded data Vcdo of each of a plurality of blocks BL constituting a frame, and obtains them. The data separating circuit 262 supplies the index information Vcdp (block information) and the encoded data Vcdo of each of the plurality of blocks BL to the corresponding-block extracting circuit 263 and the block decoding circuit 267, respectively. Further, the data separating circuit 262 supplies the minimum value Vcdmin of the pixel values and the sort-order information Vcds for each of the plurality of blocks BL to the adder 269 and the reverse-sorting circuit 270, respectively.

As in the encoder 152, the circuits downstream of the data separating circuit 262, i.e., the corresponding-block extracting circuit 263, the minimum value detecting circuit 264, the sorting circuit 265, the subtractor 266, the block decoding circuit 267, the adders 268 and 269, the reverse-sorting circuit 270, and the block decomposition circuit 271, perform processing on each of the plurality of blocks BL as a target block BLc.

The corresponding-block extracting circuit 263 has similar functions to the corresponding-block extracting circuit 237 and the search-range-block forming circuit 233 of the encoder 152. The corresponding-block extracting circuit 263 extracts the corresponding block BLT from the frame memory 272 based on the index information Vcdp from the data separating circuit 262, and supplies the extracted corresponding block BLT to the minimum value detecting circuit 264 and the sorting circuit 265.

The minimum value detecting circuit 264 detects the minimum value i_min of the pixel values of the pixels constituting the corresponding block BLT, and supplies the minimum value i_min to the subtractor 266.

The sorting circuit 265 sorts the pixels constituting the corresponding block BLT in order according to the pixel values, as in the corresponding-block sorting circuit 214 of the encoder 152, and supplies the sorted pixels to the subtractor 266.

As in the subtractor 254 of the encoder 152, the subtractor 266 subtracts the minimum value i_min of the corresponding block BLT supplied from the minimum value detecting circuit 264 from the pixel values of the sorted pixels constituting the corresponding block BLT supplied from the sorting circuit 265 (that is, the subtractor 266 offsets the minimum value i_min from the pixel values of the pixels constituting the corresponding block BLT). Then, the subtractor 266 supplies the resulting values to the adder 268. The differences output from the subtractor 266 between the pixel values of the sorted pixels constituting the corresponding block BLT and the minimum value i_min of the corresponding block BLT represent the pixel differences for the pixels constituting the corresponding block BLT illustrated in FIG. 11 (that is, the pixel-difference waveform of the corresponding block BLT).

The block decoding circuit 267 decodes the encoded data Vcdo of the target block BLc supplied from the data separating circuit 262, and supplies the resulting block difference data to the adder 268. Specifically, the block decoding circuit 267 performs entropy decoding and dequantization on the encoded data Vcdo supplied from the data separating circuit 262, and performs an inverse discrete sine transform (IDST) on the dequantized encoded data Vcdo to determine the block difference data of the target block BLc. The block decoding circuit 267 supplies the block difference data to the adder 268.

The adder 268 sums the block difference data of the target block BLc from the block-decoding circuit 267 for each of the pixels constituting the target block BLc and the pixel differences of the corresponding block BLT from the subtractor 266. Thus, the pixel differences for the pixels constituting the target block BLc illustrated in the upper left graph of FIG. 11 (i.e., the pixel-difference waveform of the target block BLc) is obtained.

The adder 269 sums the pixel differences and the minimum value Vcdmin (first minimum value) from the data separating circuit 262 for the pixels constituting the target block BLc. The sums determined by the adder 269 represent the output pixel values of the pixels constituting the target block BLc. The output pixel values are supplied to the reverse-sorting circuit 270.

The reverse-sorting circuit 270 rearranges the output pixel values of the pixels constituting the target block BLc in the original spatial phase (raster order) according to the sort-order information Vcds from the data separating circuit 262. That is, the reverse-sorting circuit 270 performs reverse-sorting in the spatial phase prior to the sorting. The reverse-sorting circuit 270 supplies the output pixel values of the pixels constituting the target block BLc that are rearranged in the original spatial phase to the block decomposition circuit 271.

The block decomposition circuit 271 returns the output pixel values of the pixels constituting the target block BLc to the predetermined locations on the frame prior to the division into the plurality of blocks BL to construct an image of the frame from the plurality of divided blocks BL. Then, the block decomposition circuit 271 supplies (outputs) the resulting image of the frame as a digital image signal Vdg2 to the frame memory 272 and the output terminal 273.

The output terminal 273 outputs the decoded digital image signal Vdg2 from the block decomposition circuit 271 (to the D/A converter 156 (see FIG. 2)).

The local decoder 231 shown in FIG. 3 has a similar structure to a dotted-line block shown in FIG. 14 including the data separating circuit 262, the corresponding-block extracting circuit 263, the minimum value detecting circuit 264, the sorting circuit 265, the subtractor 266, the block decoding circuit 267, the adders 268 and 269, the reverse-sorting circuit 270, and the block decomposition circuit 271.

Figure 15:
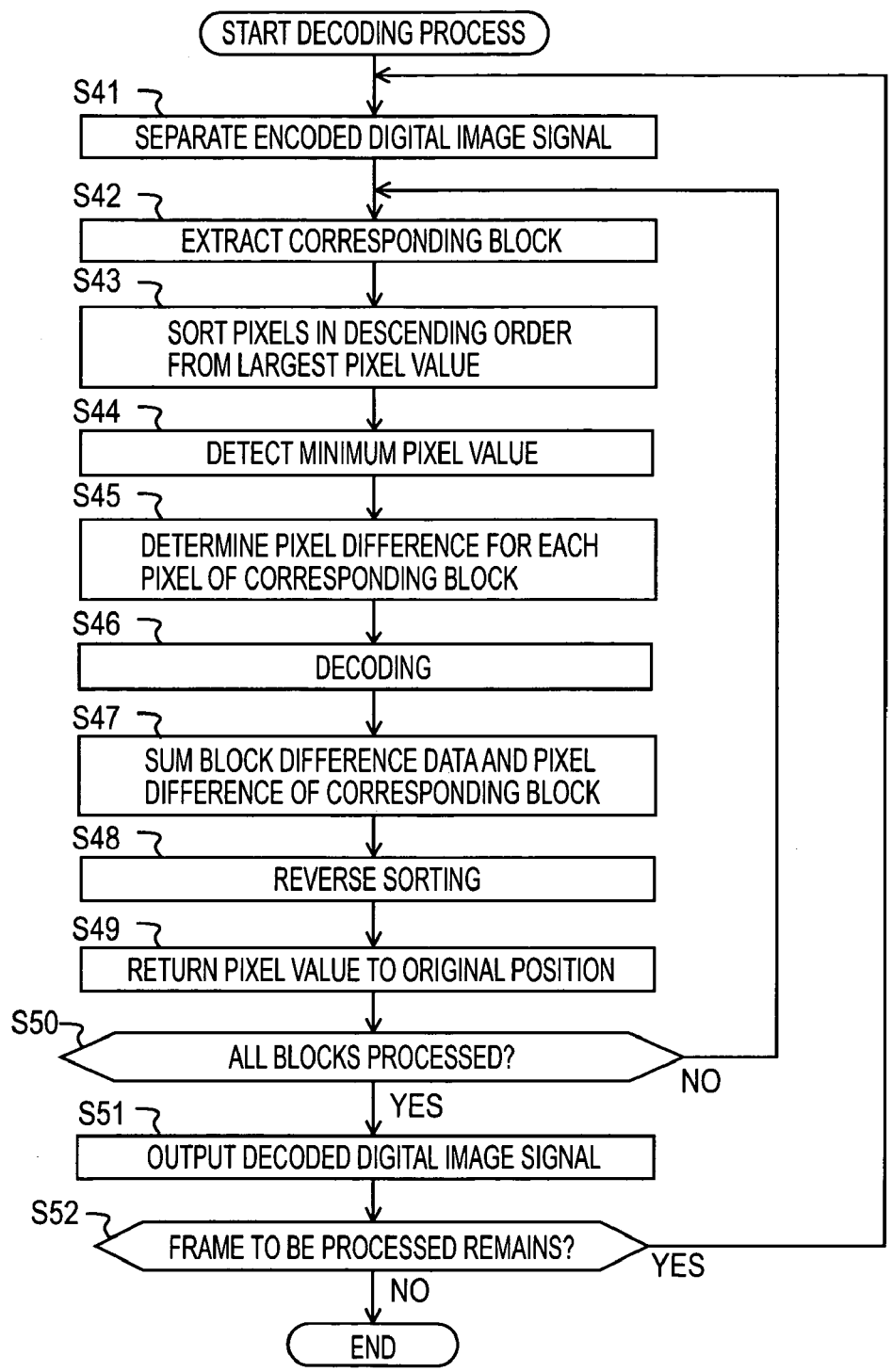
FIG. 15 is a flowchart showing a decoding process.

FIG. 15 is a flowchart showing a decoding operation of the decoder 155 shown in FIG. 2.

First, in step S41, the data separating circuit 262 separates the encoded digital image signal Vcd1 of one frame supplied from the encoder 152 via the input terminal 261 into the minimum value Vcdmin of pixel values, the sort-order information Vcds, the index information Vcdp identifying the corresponding block BLT, and the encoded data Vcdo of each of a plurality of blocks BL constituting the frame, and obtains them.

In step S41, further, the data separating circuit 262 supplies the index information Vcdp and the encoded data Vcdo separated from the encoded digital image signal Vcd1 of the frame to the corresponding-block extracting circuit 263 and the block decoding circuit 267, respectively. In step S41, the data separating circuit 262 also supplies the minimum value Vcdmin of the pixel values and the sort-order information Vcds separated from the encoded digital image signal Vcd1 of the frame to the adder 269 and the reverse-sorting circuit 270, respectively.

In step S42, one of the plurality of divided blocks BL is rendered as a target block BLc. In step S42, further, the corresponding-block extracting circuit 263 extracts the corresponding block BLT from the frame memory 272 based on the index information Vcdp from the data separating circuit 262, and supplies the extracted corresponding block BLT to the minimum value detecting circuit 264 and the sorting circuit 265.

In step S43, the sorting circuit 265 sorts the pixels constituting the corresponding block BLT in the descending order from the largest pixel value, and supplies the sorted pixels to the subtractor 266.

In step S44, the minimum value detecting circuit 264 detects the minimum value i_min of the corresponding block BLT, and supplies the minimum value i_min to the subtractor 266.

In step S45, the subtractor 266 determines pixel differences for the pixels constituting the corresponding block BLT. Specifically, the subtractor 266 subtracts the minimum value i_min of the corresponding block BLT from the pixel values of the sorted pixels constituting the corresponding block BLT (that is, the subtractor 266 offsets the minimum value i_min from the pixel values of the pixels constituting the corresponding block BLT). Then, the subtractor 266 supplies the resulting values to the adder 268.

In step S46, the block decoding circuit 267 decodes the encoded data Vcdo of the target block BLc, and supplies the resulting block difference data to the adder 268.

In step S47, the adder 268 sums the block difference data from the block decoding circuit 267 for each of the pixels constituting the target block BLc and the pixel differences of the corresponding block BLT, and supplies the sums to the adder 269.

In step S47, further, the adder 269 sums the pixel differences and the minimum value Vcdmin from the data separating circuit 262 for the pixels constituting the target block BLc, and supplies the sums to the reverse-sorting circuit 270.

In step S48, the reverse-sorting circuit 270 reverse-sorts the output pixel values of the pixels constituting the target block BLc according to the sort-order information Vcds from the data separating circuit 262. Specifically, the reverse-sorting circuit 270 rearranges the output pixel values of the pixels constituting the target block BLc in the original spatial phase (raster order) according to the sort-order information Vcds from the data separating circuit 262. Then, the reverse-sorting circuit 270 supplies the rearranged pixel values to the block decomposition circuit 271.

In step S49, the block decomposition circuit 271 returns the output pixel values of the pixels constituting the target block BLc to the predetermined locations on the frame prior to the division into the plurality of blocks BL to construct an image of the frame from the plurality of divided blocks BL.

In step S50, the decoder 155 determines whether or not all blocks BL constituting the frame have been processed, that is, whether or not each of the blocks BL of the image of the frame has been rendered as the target block BLc. If it is determined in step S50 that all blocks BL of the image of the frame have not been processed, the flow returns to step S42, and an unprocessed block BL is rendered as the target block BLc. Then, the processing of steps S42 through S50 is repeatedly performed.

If it is determined in step S50 that all blocks BL of the image of the frame have been processed, then, in step S51, the block decomposition circuit 271 supplies (outputs) the decoded digital image signal Vdg2 of the frame to the frame memory 272 and the output terminal 273.

In step S52, the decoder 155 determines whether or not there remains an image of a frame to be processed, that is, whether or not an image of a frame to be subsequently processed has been supplied from the encoder 152.

If it is determined in step S52 that there remains an image of a frame to be processed, the flow returns to step S41, and the processing after step S41 is repeatedly performed.

If it is determined in step S52 that an image of a frame to be processed does not remain, that is, if an image of a frame to be subsequently processed is not supplied from the encoder 152, the process ends.

In the decoding process, therefore, the encoded digital image signal Vcd1 is supplied (input) to the data separating circuit 262 via the input terminal 261 on a frame-by-frame basis. The encoded digital image signal Vcd1 of one frame is separated into the minimum value Vcdmin of the pixel values, the sort-order information Vcds, the index information Vcdp identifying the corresponding block BLT, and the encoded data Vcdo of each of the plurality of blocks BL.

The block decoding circuit 267 decodes the encoded data Vcdo of the target block BLc to obtain block difference data.

The block difference data, the pixel values of the pixels constituting the corresponding block BLT extracted using the index information Vcdp, and the minimum value Vcdmin of the target block BLc are used to generate output pixel values of the pixels constituting the target block BLc.

Specifically, the pixel differences of the corresponding block BLT, which represent the differences between the pixel values of the pixels constituting the corresponding block BLT and the minimum value of the corresponding block BLT, are determined. The pixel differences and the decoded block difference data are summed. The sums and the minimum value Vcdmin of the target block BLc are further summed to generate the output pixel values of the pixels constituting the target block BLc.

The generated output pixel values of the pixels constituting the target block BLc are reverse-sorted in the spatial phase prior to the sorting according to the sort-order information Vcds. The processing described above is repeatedly performed on each of the plurality of blocks BL as the target block BLc to construct an image of the frame from the plurality of divided blocks BL. The decoded digital image signal Vdg2 is thus output.

Figure 16:
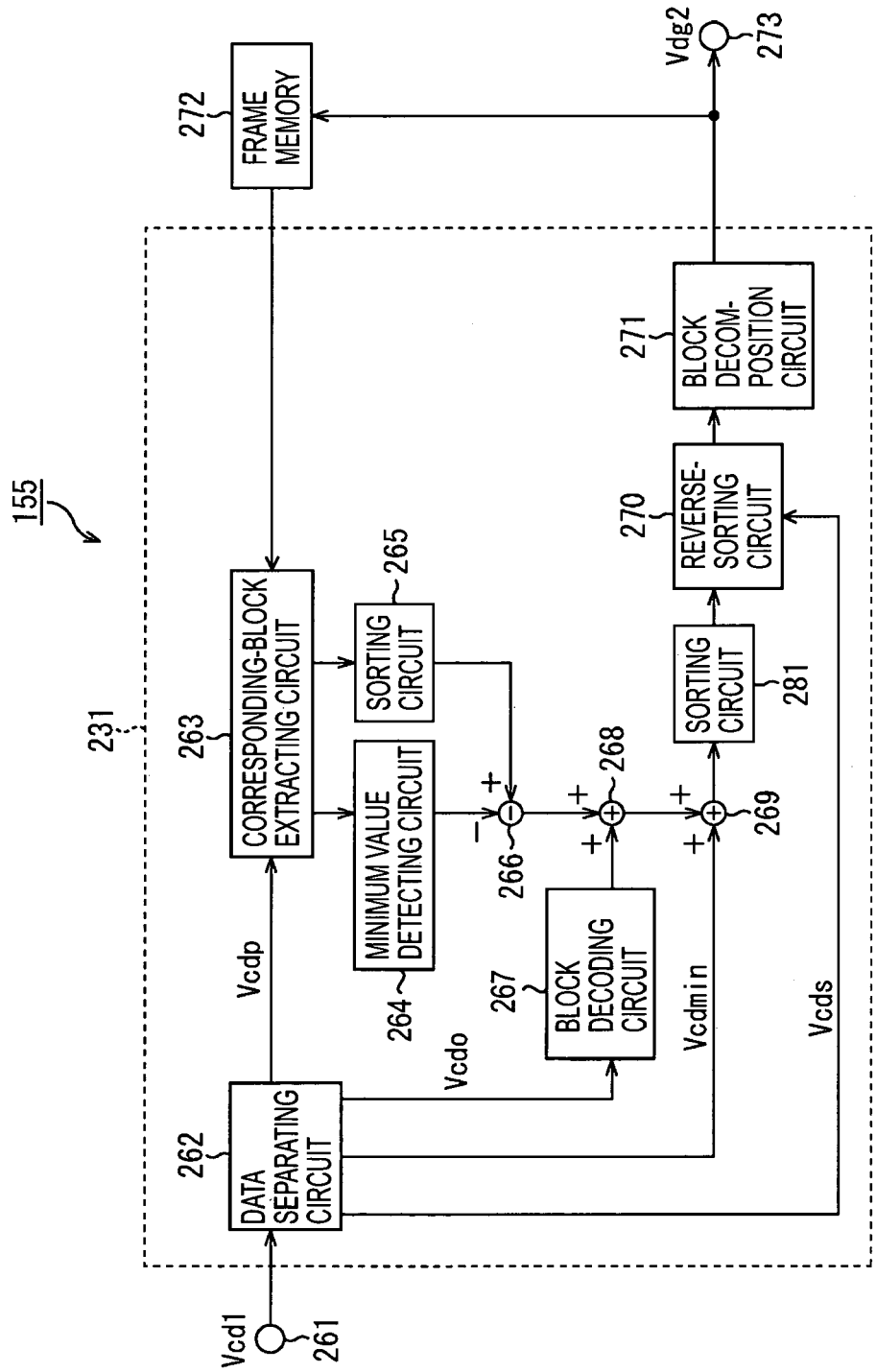
FIG. 16 is a block diagram showing another example detailed structure of the decoder 155.

FIG. 16 is a block diagram showing another example detailed structure of the decoder 155 of the decoder 155 of the recording apparatus 113 shown in FIG. 2.

In FIG. 16, the corresponding portions to those of the decoder 155 shown in FIG. 14 are assigned the same reference numerals, and a description thereof is omitted.

The decoder 155 shown in FIG. 16 has a similar structure to that of the decoder 155 shown in FIG. 14, except for an additional sorting circuit 281 between the adder 269 and the reverse-sorting circuit 270.

The output pixel values of the pixels constituting the target block BLc that are output from the adder 269 are basically sorted in the descending order from the largest pixel value, which is the same as the sort order used in the encoder 152 (specifically, the input-block sorting circuit 251). However, an encoding distortion of the encoder 152 (due to quantization, etc.) may cause a change in the sort order. Thus, the sorting circuit 281 rearranges (sorts) the output pixel values of the pixels constituting the target block BLc supplied from the adder 269 in the descending order from the largest pixel value. The output pixel values of the pixels constituting the target block BLc that are sorted again in the descending order from the largest pixel value are supplied to the reverse-sorting circuit 270.

Figure 17:
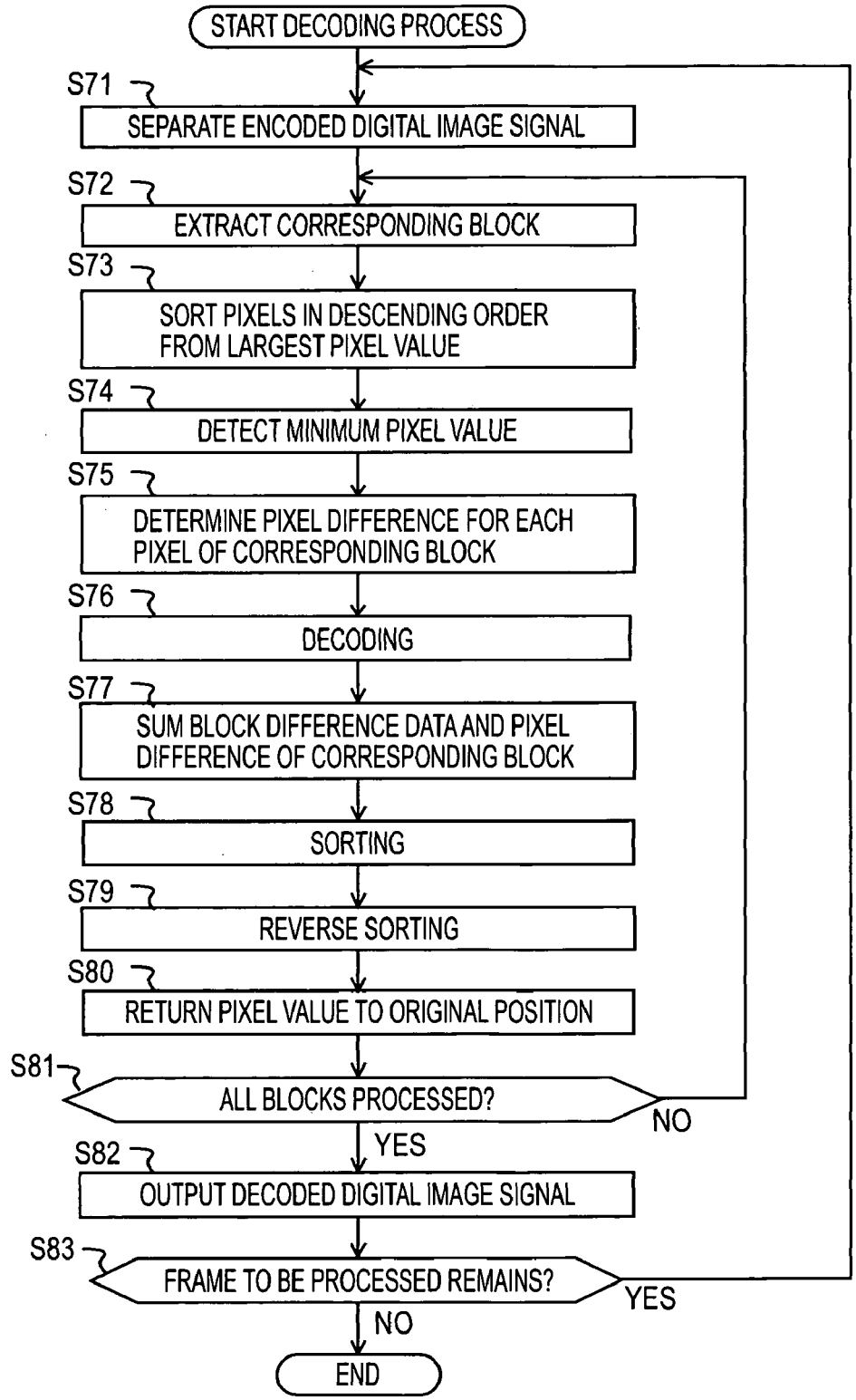
FIG. 17 is a flowchart showing another decoding process.

FIG. 17 is a flowchart showing a decoding operation of the decoder 155 shown in FIG. 16.

The processing of steps S71 through S77 and steps S79 through S83 shown in FIG. 17 is similar to the processing of steps S41 through S52 shown in FIG. 15. In other words, in the decoding process shown in FIG. 17, the processing of step S78 shown in FIG. 17 is additionally performed between the processing of step S47 and the processing of step S48 shown in FIG. 15.

In step S78, the sorting circuit 281 rearranges (sorts) the output pixel values of the pixels constituting the target block BLc supplied from the adder 269 in the descending order from the largest pixel value. The output pixel values of the pixels constituting the target block BLc that are sorted again in the descending order from the largest pixel value are supplied to the reverse-sorting circuit 270.

In the decoding process shown in FIG. 17, therefore, the encoded digital image signal Vcd1 is supplied (input) to the data separating circuit 262 via the input terminal 261 on a frame-by-frame basis. The encoded digital image signal Vcd1 of one frame is separated into the minimum value Vcdmin of the pixel values, the sort-order information Vcds, the index information Vcdp identifying the corresponding block BLT, and the encoded data Vcdo of each of the plurality of blocks BL.

The block decoding circuit 267 decodes the encoded data Vcdo of the target block BLc to obtain block difference data.

The block difference data, the pixel values of the pixels constituting the corresponding block BLT extracted using the index information Vcdp, and the minimum value Vcdmin of the target block BLc are used to generate pixel values of the pixels constituting the target block BLc.

After sorting the generated output pixel values of the pixels constituting the target block BLc, the sorted output pixel values are reverse-sorted in the spatial phase prior to the sorting according to the sort-order information Vcds. The processing described above is repeatedly performed on each of the plurality of blocks BL as the target block BLc to construct an image of the frame from the plurality of divided blocks BL. The decoded digital image signal Vdg2 is thus output.

Figure 18:
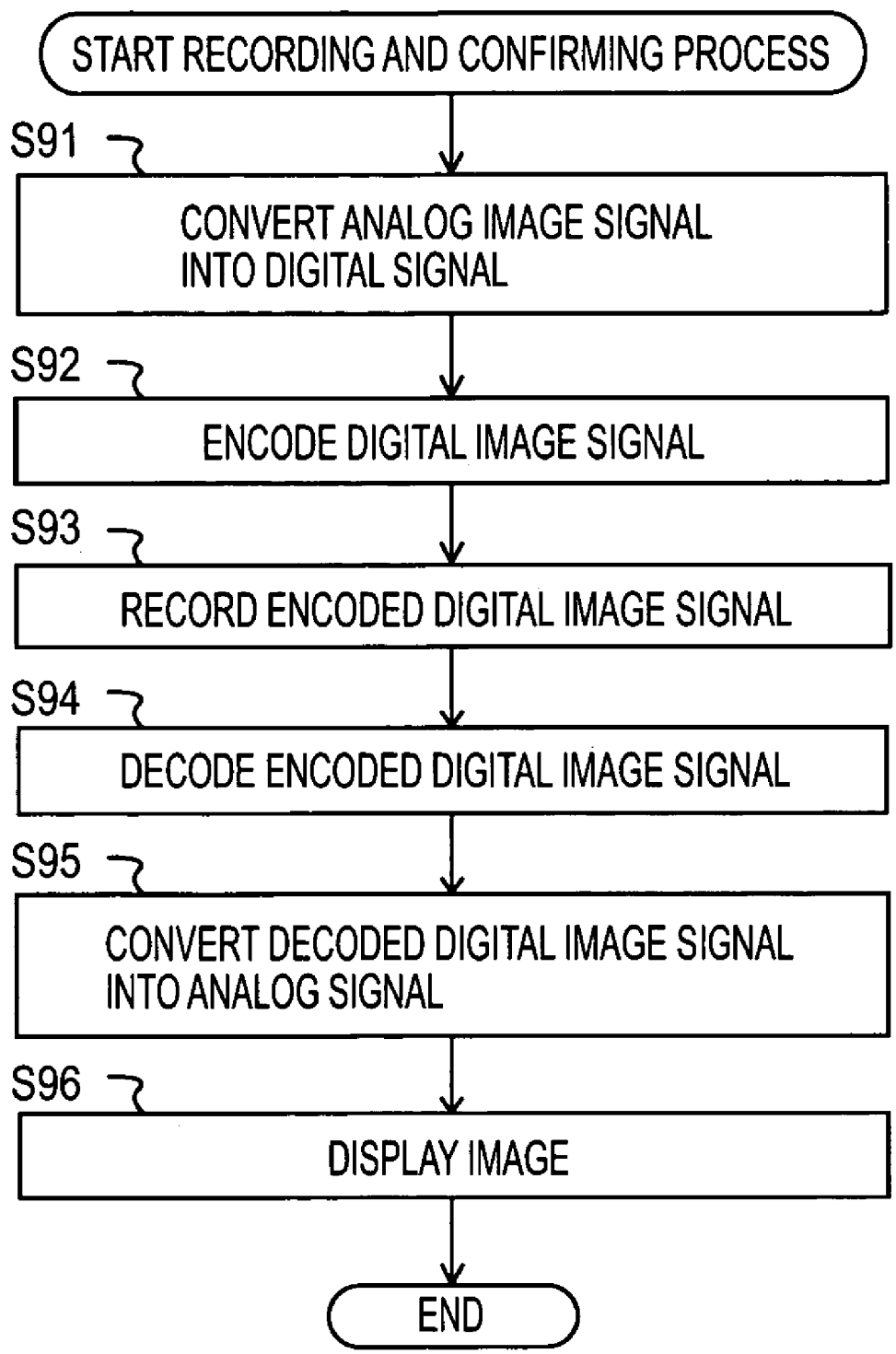
FIG. 18 is a flowchart showing a recording and confirming operation of a recording apparatus 113 of the image processing system shown in FIG. 2.

FIG. 18 is a flowchart showing a recording and confirming operation of the recording apparatus 113 shown in FIG. 2 to record (copy) an image signal onto the recording medium 122 using the analog image signal Van1 output from the playback apparatus 111 and to confirm an image on the display 143 when the encoded digital image signal Vcd1 recorded on the recording medium 122 is decoded by a certain playback apparatus and is displayed on a display.

First, in step S91, the A/D converter 151 converts the input analog image signal Van1 into a digital image signal Vdg1, and supplies the digital image signal Vdg1 to the encoder 152.

In step S92, the encoder 152 encodes the digital image signal Vdg1 from the A/D converter 151, and supplies the encoded digital image signal, namely, Vcd1, to the medium recorder 153 and the playback unit 142 (specifically, the decoder 155).

In step S93, the medium recorder 153 records the encoded digital image signal Vcd1 from the encoder 152 onto the recording medium 122.

In step S94, the decoder 155 decodes the encoded digital image signal Vcd1 from the encoder 152, and supplies the decoded digital image signal, namely, Vdg2, to the D/A converter 156. The processing of step S93 and the processing of step S94 may be performed in parallel.

In step S95, the D/A converter 156 converts the decoded digital image signal Vdg2 supplied from the decoder 155 into an analog image signal Van2, and outputs the analog image signal Van2 to the display 143.

In step S96, the display 143 displays an image corresponding to the analog image signal Van2 from the D/A converter 156.

In this way, the analog image signal Van1 with analog distortion, which is played back and output from the playback apparatus 111, is A/D converted into the digital image signal Vdg1, and the digital image signal Vdg1 is encoded and recorded onto the recording medium 122. That is, copying based on the analog image signal Van1 with analog distortion is carried out.

The analog image signal Van1 with analog distortion output from the playback apparatus 111 is equivalent to a signal that is decoded from the encoded digital image signal recorded on the recording medium 121 and that is output from the decoder 131. The analog image signal Van1 with analog distortion output from the playback apparatus 111 is therefore a once-encoded-and-decoded signal.

When the encoded digital image signal Vcd1 that is copied based on the analog image signal Van1 with analog distortion and that is recorded on the recording medium 122 is played back (decoded) and output from the playback apparatus 111, the analog image signal output from the playback apparatus 111 is a signal equivalent to the analog image signal Van2 output from the playback unit 142 having a similar structure to that of the playback apparatus 111. The analog image signal Van2 is equivalent to a signal that is obtained by encoding the analog image signal Van1 by the encoder 152 and decoding the encoded signal by the decoder 155, and is therefore a twice-encoded-and-decoded signal.

The image quality of the twice-encoded-and-decoded decoded digital image signal Vdg2 is much lower than that of the once-encoded-and-decoded decoded digital image signal Vdg0 played back from the recording medium 121, which is the copy source.

For example, if the analog image signal Van1 is an analog image signal involving analog distortion caused by white noise that is applied when the D/A converter 132 of the playback apparatus 111 converts the decoded digital image signal Vdg0 into an analog signal, the analog distortion causes a slight change in the pixel values of the pixels constituting the image when the analog image signal Van1 is converted into a digital signal by the A/D converter 151 of the recording apparatus 113.

Therefore, the dynamic range DR of the target block BLc determined in the second encoding operation performed by the encoder 152 is different from the dynamic range determined in the first encoding operation. The corresponding block BLT extracted based on the dynamic range DR of the target block BLc is also different from the corresponding block extracted in the first operation, and the encoding distortion (quantization distortion) caused by encoding the block difference data between the target block BLc and the corresponding block BLT differs from the encoding distortion in the first operation. As a result, a large amount of distortion occurs. Therefore, the image quality of the decoded digital image signal Vdg2 obtained by decoding the encoded digital image signal Vcd1 encoded in the second encoding operation is greatly reduced.

For example, if the analog image signal Van1 is an analog image signal involving analog distortion caused by phase shifting that occurs when the D/A converter 132 of the playback apparatus 111 converts the decoded digital image signal Vdg0 into an analog signal, the sampling phase is shifted when the analog image signal Van1 is converted into a digital signal by the A/D converter 151 of the recording apparatus 113. Due to the sampling phase shifting, the block BL based on which the encoder 152 performs the second encoding operation is rendered different from the block BL based on which the first encoding operation is performed. Thus, the encoding distortion that occurs in the second encoding operation differs from the encoding distortion that occurs in the first operation. As a result, a large amount of distortion occurs. Therefore, the image quality of the decoded digital image signal Vdg2 obtained by decoding the encoded digital image signal Vcd1 encoded in the second encoding operation is greatly reduced.

When an input digital image signal, instead of using the analog image signal Van1 converted from the decoded digital image signal Vdg0, is encoded by the encoder 152 and is recorded onto the recording medium 122, the encoder 152 causes no analog distortion, resulting in no degradation of the image quality. Thus, if the digital image signal itself is copied using the encoder 152 and the decoder 155 (131), the image quality of the copied image signal is not reduced (that is, the degradation in image quality is prevented).

If the analog image signal Van1 output from the playback apparatus 111 is a twice-encoded-and-decoded signal, the signal copied therefrom that is played back from the recording medium 122 is equivalent to the analog image signal Van2 that has been encoded and decoded three times, and the quality of the played back image is further reduced. The greater the number of times the encoding and decoding operations are performed, the lower the quality of the image played back from the image signal recorded on the recording medium 122.

Accordingly, the recording and playback apparatus 113 disables copying using the analog image signal while maintaining high image quality. It also prevents unauthorized copying using the analog image signal by greatly reducing the quality of the images corresponding to the image signals that are encoded and decoded twice and more times.

The image processing system 101 shown in FIG. 2 employs a natural analog distortion to reduce the image quality, thereby preventing unauthorized copying without performing special processing on the analog image signal Van1 (to reduce the image quality). Thus, no special means or circuit for preventing unauthorized copying is needed, and there arises no problem of complicated structures (increased circuit size). While the image processing system 101 shown in FIG. 2 employs an analog distortion that occurs when the D/A converter 132 of the playback apparatus 111 converts the decoded digital image signal Vdg0 into an analog signal, an analog distortion that occurs in a transmission channel from the D/A converter 132 to the A/D converter 151 or an analog distortion that occurs in the A/D converter 151 may also be employed to achieve a similar advantage (considerable degradation in image quality of the decoded digital image signal Vdg2).

In addition to a natural analog distortion, the image processing system 101 shown in FIG. 2 may add noise (analog noise) that intentionally causes an analog distortion to the analog image signal Van1 output from the playback apparatus 111.

Figure 19:
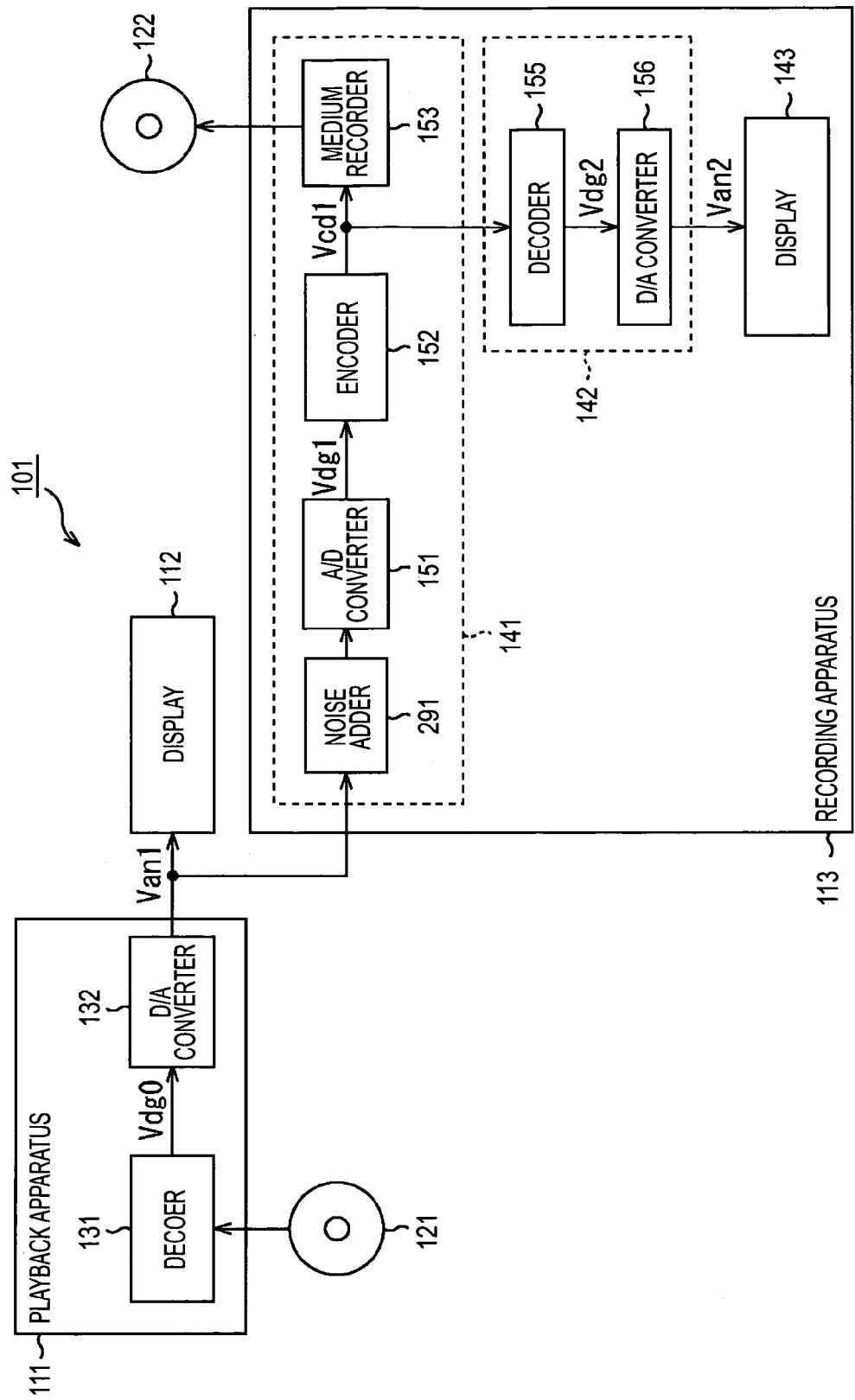
FIG. 19 is a block diagram showing an example structure of an image processing system according to another embodiment of the present invention.

FIG. 19 is a block diagram showing an example structure of an image processing system 101 according to another embodiment of the present invention.

In FIG. 19, portions corresponding to those of the image processing system 101 shown in FIG. 2 are assigned the same reference numerals, and a description thereof is omitted.

The image processing system 101 shown in FIG. 19 has a similar structure to the image processing system 101 shown in FIG. 2, except for an additional noise adder 291 in the recording unit 141 of the recording apparatus 113.

The analog image signal Van1 output from the playback apparatus 111 is input to the noise adder 291 of the recording apparatus 113. The noise adder 291 adds noise to the input analog image signal Van1, and supplies the resulting signal to the A/D converter 151.

Figure 20:
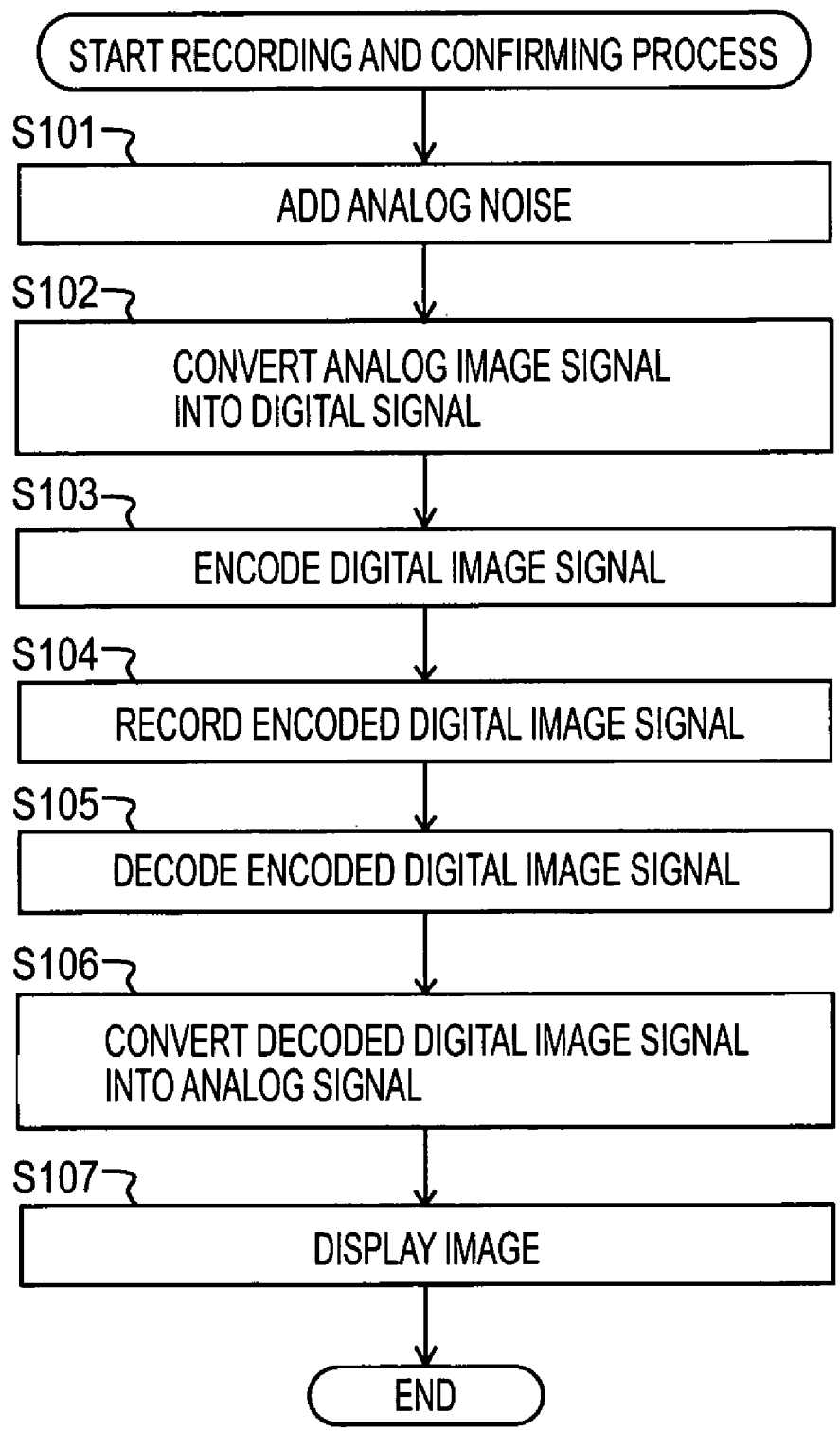
FIG. 20 is a flowchart showing a recording and confirming operation of a recording apparatus 113 of the image processing system shown in FIG. 19.

FIG. 20 is a flowchart showing a recording and confirming operation of the recording apparatus 113 in the image processing system 101 shown in FIG. 19.

First, in step S101, the noise adder 291 adds noise to the analog image signal Van1 from the playback apparatus 111, and supplies the resulting signal to the A/D converter 151.

The processing of steps S102 through S107 is similar to the processing of steps S91 through S96 shown in FIG. 18. Specifically, the analog image signal Van1 involving a larger amount of analog distortion due to the added noise is converted into a digital image signal Vdg1 by the A/D converter 151, and the digital image signal Vdg1 is encoded by the encoder 152. The encoded digital image signal, namely, Vcd1, is recorded onto the recording medium 122. The encoded digital image signal Vcd1 is decoded, and the decoded digital image signal, namely, Vdg2, is converted into an analog signal (analog image signal Van2), which is then displayed as an image on the display 143.

In the recording apparatus 113 shown in FIG. 19, therefore, the analog image signal Van1 to which noise is intentionally added in addition to the natural analog distortion to cause an analog distortion (involve an analog distortion) is encoded. In this case, the image quality is further reduced by performing the encoding and decoding operations twice and more times, and unauthorized copying using the analog image signal is thus prevented.

In a case of intentionally adding noise to an analog image signal, the playback apparatus 111 may output the analog image signal Van1 after adding noise.

Figure 21:
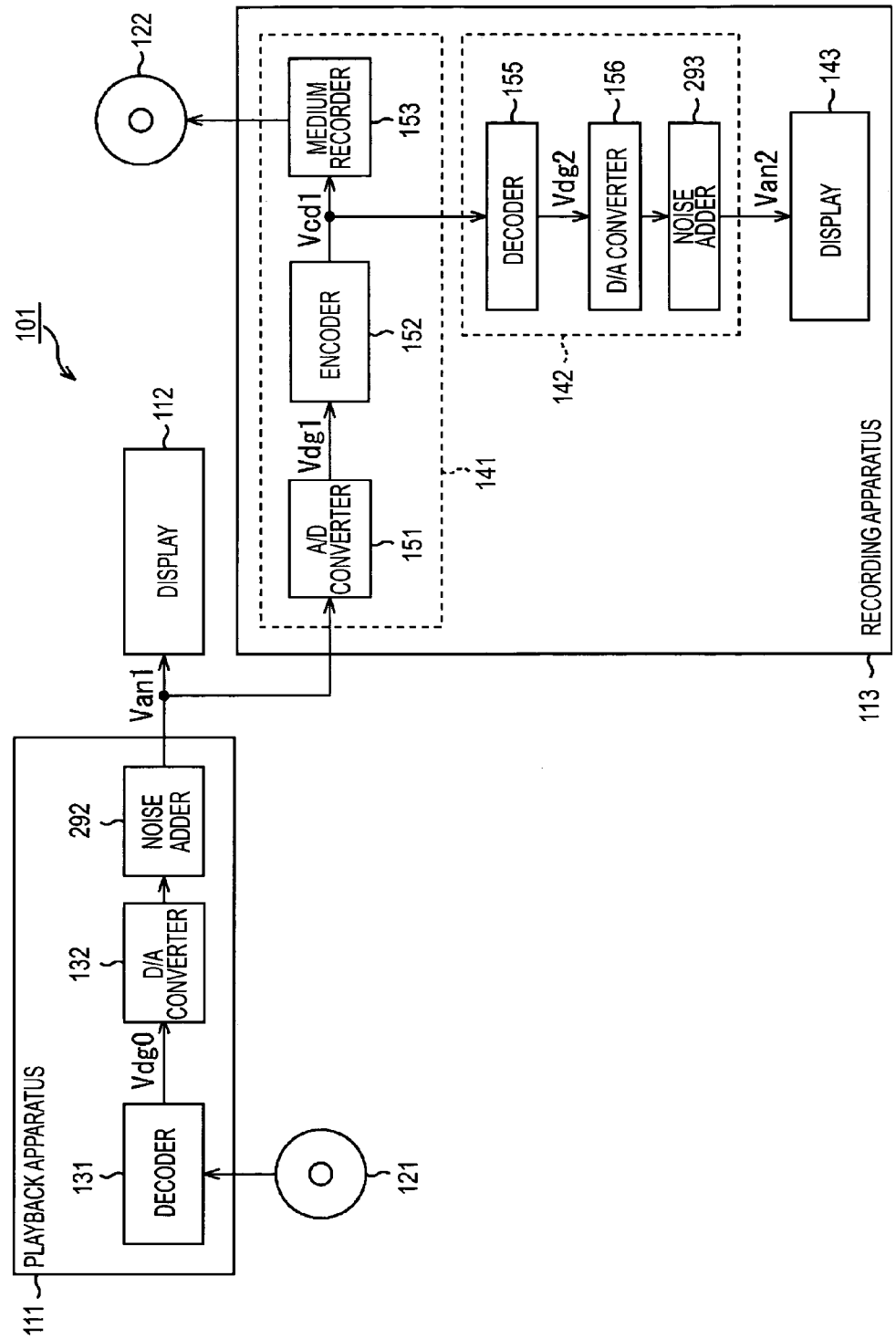
FIG. 21 is a block diagram showing an example structure of an image processing system according to still another embodiment of the present invention.

FIG. 21 is a block diagram showing an example structure of an image processing system 101 according to still another embodiment of the present invention.

In FIG. 21, portion corresponding to those of the image processing system 101 shown in FIG. 2 are assigned the same reference numerals, and a description thereof is omitted.

The image processing system 101 shown in FIG. 21 is similar to the image processing system 101 shown in FIG. 2, except for an additional noise adder 292 in the playback apparatus 111 and, therefore, an additional noise adder 293 in the playback unit 142 of the recording apparatus 113 having a similar structure to the playback apparatus 111.

An analog image signal played back from the recording medium 121 is fed to the noise adder 292 of the playback apparatus 111 from the D/A converter 132. The noise adder 292 adds noise to the analog image signal from the D/A converter 132, and outputs the resulting analog image signal, namely, Van1, to the display 112 and the recording apparatus 113.

Also in the playback unit 142 of the recording apparatus 113, an analog image signal is fed from the D/A converter 156 to the noise adder 293. The noise adder 293 adds noise to the analog image signal from the D/A converter 156, and outputs the resulting analog image signal, namely, Van2, to the display 143.

Figure 22:
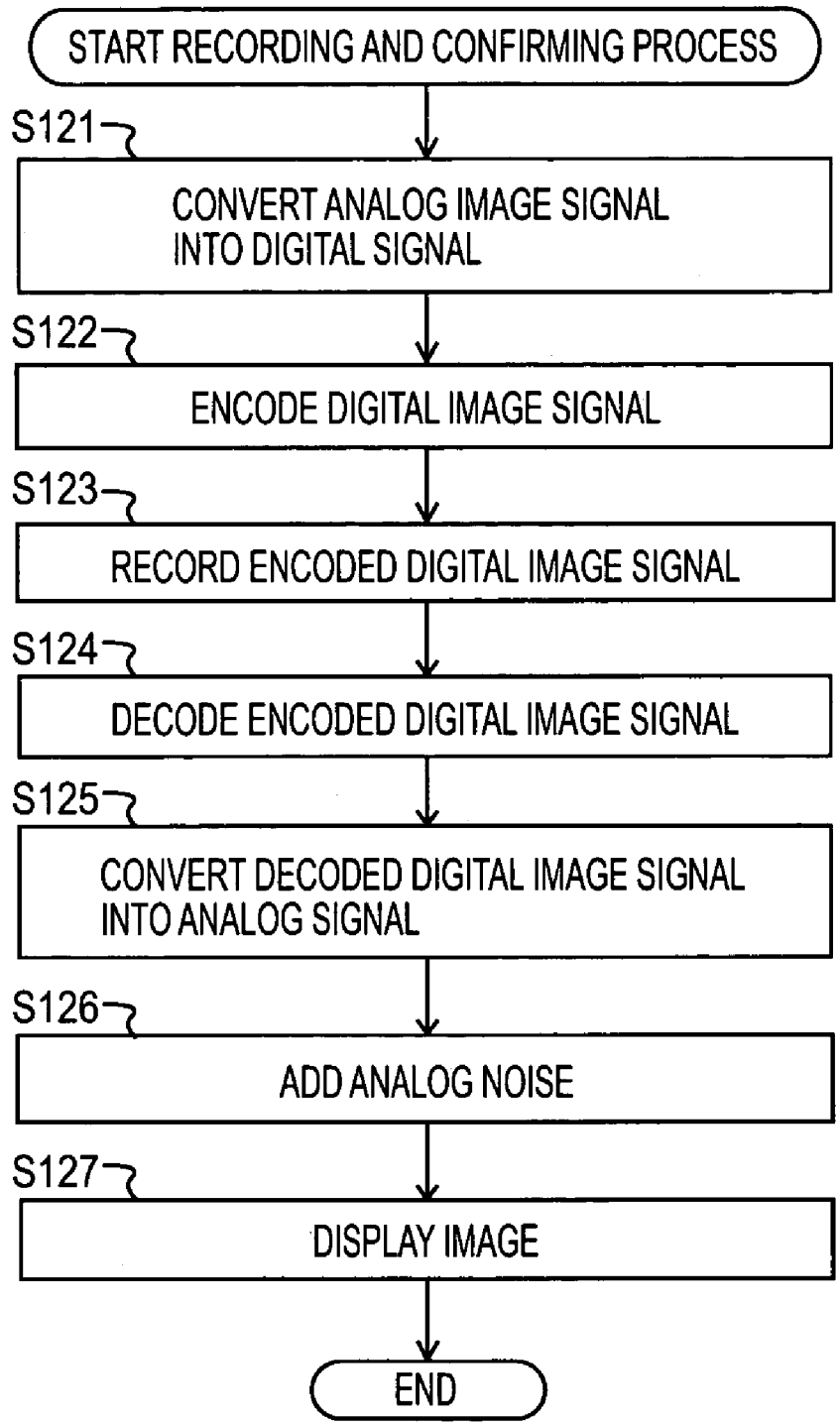
FIG. 22 is a flowchart showing a recording and confirming operation of a recording apparatus 113 of the image processing system shown in FIG. 21.

FIG. 22 is a flowchart showing a recording and confirming operation of the recording apparatus 113 in the image processing system 101 shown in FIG. 21.

The processing of steps S121 through S125 is similar to the processing of steps S91 through S95 shown in FIG. 18. Specifically, the A/D converter 151 converts the analog image signal Van1 from the playback apparatus 111 into a digital image signal Vdg1, and the encoder 152 encodes the digital image signal Vdg1 into an encoded digital image signal Vcd1. The encoded digital image signal Vcd1 is recorded onto the recording medium 122. The encoded digital image signal Vcd1 is decoded to produce a decoded digital image signal Vdg2, which is then converted into an analog signal.

After performing the processing of step S125, in step S126, the noise adder 293 adds noise to the analog image signal from the D/A converter 156, and outputs the resulting analog image signal, namely, Van2, to the display 143.

In step S127, the display 143 displays an image corresponding to the analog image signal Van2 from the noise adder 293. Then, the process ends.

Accordingly, the intentional addition of noise to the analog image signal Van1 in addition to the natural analog distortion to cause a larger amount of analog noise disables copying using the analog image signal while maintaining high image quality. The quality of the images corresponding to the image signals that have been encoded and decoded twice and more times is considerably reduced, thereby preventing unauthorized copying using the analog image signal (analog signal).

In the above-described embodiments, a plurality of blocks BL constituting one frame are sequentially processed. However, all blocks BL of one frame may be processed in parallel. While the encoder 152 and the decoder 155 perform processing on an image on a frame-by-frame basis, the image may be processed on a unit basis other than a frame-by-frame basis, such as a field-by-field basis or in units of a plurality of frames, in parallel.

In the above-described embodiments, the encoder 152 encodes block difference data representing differences for the (sorted) corresponding pixels between the pixel differences of the pixels constituting the target block BLc and the pixel differences of the pixels constituting the corresponding block BLT from the subtractor 254 (that is, the differences between the pixel differences of the target block BLc and the pixel differences of the corresponding block BLT), which are determined by the differential circuit 215. However, the encoder 152 may simply encode, as block difference data, the differences for the (sorted) corresponding pixels between the pixel values of the pixels constituting the target block BLc and the pixel values of the pixels constituting the corresponding block BLT (that is, the differences between the pixel values of the target block BLc and the pixel values of the corresponding block BLT). In this case, the encoded digital image signal Vcd1 output from the data combining circuit 217 does not need to include the minimum pixel value Vcdmin.

When the block difference data merely represents the differences for the (sorted) corresponding pixels between the pixel values of the pixels constituting the target block BLc and the pixel values of the pixels constituting the corresponding block BLT, the corresponding decoder 155 sums block difference data produced by decoding the encoded data Vcdo for each of the pixels constituting the target block BLc and the pixel values of the corresponding block BLT to produce output pixel values. The output pixel values of the pixels constituting the target block BLc are reverse-sorted in the spatial phase prior to the sorting according to the sort-order information Vcds from the data separating circuit 262.

In the encoder 152, the pixels constituting the target block BLc are sorted in order according to the pixel values, and a sort result is output as the sort-order information Vcds. Then, the minimum value Vcdmin of the target block BLc is subtracted from the pixel values of the sorted pixels constituting the target block BLc, and the resulting values are output as the pixel differences. However, the minimum value Vcdmin of the target block BLc may first be subtracted from the pixel values of the pixels constituting the target block BLc, and the resulting pixel differences of the pixels constituting the target block BLc may be sorted in order according to the pixel differences. Then, a sort result may be output as the sort-order information Vcds, and the sorted pixel differences may also be output. Also in this case, the sort-order information Vcds and the pixel differences for the sorted pixels constituting the target block BLc are the same as those obtained by sorting the pixels in the order according to the pixel values.

The series of the recording and confirming process, the encoding process, and the decoding process, described above, may be executed by either dedicated hardware or software. When the series of processes is executed by software, for example, the series of processes can be implemented by a program executed by a (personal) computer shown in FIG. 23.

In FIG. 23, a central processing unit (CPU) 301 executes various processes according to a program stored in a read only memory (ROM) 302 or a program loaded into a random access memory (RAM) 303 from a storage unit 308. The RAM 303 also stores data needed for the CPU 301 to execute the processes, as needed.

The CPU 301, the ROM 302, and the RAM 303 are connected to each other via a bus 304. An input/output interface 305 is also connected to the bus 304.

An input unit 306 including a keyboard, a mouse, and an input terminal, an output unit 307 including a display, such as a CRT or an LCD, an output terminal, and a loudspeaker, the storage unit 308 including a hard disk, and a communication unit 309 including a terminal adapter, an asymmetric digital subscriber line (ADSL) modem, and a local area network (LAN) card are connected to the input/output interface 305. The communication unit 309 performs communication via various networks, such as the Internet.

A drive 310 is also connected to the input/output interface 305. A removable recording medium 321, such as a magnetic disk (including a floppy disk), an optical disk (including a compact disk-read only memory (CD-ROM) and a DVD), a magneto-optical disk (including a Mini-Disk (MD)), or a semiconductor memory, is appropriately loaded, and a computer program read therefrom is installed into the storage unit 308, as needed.

For example, the CPU 301 shown in FIG. 23 that executes the program corresponds to the A/D converter 151, the encoder 152, the decoder 155 (decoder 131), and the D/A converter 156 (D/A converter 132) shown in FIG. 2. The drive 310 corresponds to the medium recorder 153. The output unit 307 corresponds to the display 143.

In this document, the steps shown in the flowcharts may or may not be performed in a time-series manner according to the order in which the steps are executed, or may be performed in parallel or individually.

In this document, the term system means an entire apparatus composed of a plurality of apparatuses.

It should be understood by those skilled in the art that various modifications, combinations, sub-combinations and alterations may occur depending on design requirements and other factors insofar as they are within the scope of the appended claims or the equivalents thereof.

What is claimed is:

1. An encoding apparatus for encoding input image data including at least a first image and a second image, the encoding apparatus comprising:
   a block forming circuit that divides the first image into a plurality of blocks;
   a corresponding-block detecting circuit that detects from the second image a second block corresponding to a first block that is one of the plurality of blocks;
   a sorting circuit that sorts pixels forming each of the first block and the second block in order according to pixel values;
   a differential circuit that determines block difference data indicating an amount of change in the pixel values of the sorted pixels between the first block and the second block; and
   an encoding circuit that encodes the block difference data.

2. The encoding apparatus according to claim 1, further comprising a noise-adding unit that adds noise to the input image data.

3. The encoding apparatus according to claim 1, wherein the encoding circuit encodes the block difference data by performing a discrete sine transform on the block difference data to determine a discrete-sine-transform coefficient and quantizing the discrete-sine-transform coefficient.

4. The encoding apparatus according to claim 1, wherein the corresponding-block detecting circuit includes:
- a search-range-block forming circuit that extracts from the second image a plurality of candidate blocks that are candidates of the second block;
- a parameter determining circuit that determines a parameter for each of the plurality of candidate blocks, the parameter indicating a feature value of pixels forming each candidate block; and
- a corresponding-block detecting circuit that detects the second block corresponding to the first block from the plurality of candidate blocks on the basis of the parameter.

5. The encoding apparatus according to claim 4, wherein the parameter includes at least a dynamic range of pixel values of the pixels forming each of the candidate blocks, and
- the corresponding-block detecting circuit detects one of the candidate blocks as the second block, the candidate block having a dynamic range that matches a dynamic range of the first block.

6. The encoding apparatus according to claim 1, wherein the differential circuit determines the block difference data by determining pixel differences for the pixels forming each of the first block and the second block, the pixel differences being differences between pixel values and a minimum pixel value of pixels forming each block, and determining differences between the pixel differences of the first block and the pixel differences of the second block.

7. The encoding apparatus according to claim 1, further comprising a data combining circuit that outputs block information identifying the second block from the second image, sort-order information indicating a sort result of sorting the pixels forming the first block, and the block difference data encoded by the encoding circuit.

8. An encoding method for an encoding apparatus that encodes input image data including at least a first image and a second image, the encoding method comprising the steps of:
- dividing the first image into a plurality of blocks;
- detecting from the second image a second block corresponding to a first block that is one of the plurality of blocks;
- sorting pixels forming each of the first block and the second block in order according to pixel values;
- determining block difference data indicating an amount of change in the pixel values of the sorted pixels between the first block and the second block; and
- encoding the block difference data.

9. A non-transitory recording medium having a program recorded thereon, the program causing a computer to execute a process for encoding input image data including at least a first image and a second image, the program comprising the steps of:
- dividing the first image into a plurality of blocks;
- detecting from the second image a second block corresponding to a first block that is one of the plurality of blocks;
- sorting pixels forming each of the first block and the second block in order according to pixel values;
- determining block difference data indicating an amount of change in the pixel values of the sorted pixels between the first block and the second block; and
- encoding the block difference data.

10. A decoding apparatus comprising:
- a data separating circuit that obtains a first minimum value, block information, sort-order information, and encoded block difference data,
- the first minimum value being a minimum value of pixel values of pixels forming a first block that is one of a plurality of blocks into which a first image is divided,
- the block information identifying a second block corresponding to the first block in a second image different from the first image,
- the sort-order information indicating a sort result of sorting the pixels forming the first block and the second block in order according to pixel differences, the pixel differences being differences between pixel values and a minimum pixel value of pixels forming each block,
- the encoded block difference data being obtained by encoding block difference data indicating an amount of change in the pixel differences for the sorted pixels between the first block and the second block;
- a block decoding circuit that decodes the encoded block difference data into the block difference data;
- a generating circuit that generates pixel values of the pixels forming the first block using the block difference data decoded by the block decoding circuit, the pixel differences for the pixels forming the second block identified by the block information, and the first minimum value; and
- a reverse-sorting circuit that reverse-sorts the pixel values of the pixels forming the first block generated by the generating circuit in a spatial phase prior to the sorting according to the sort-order information.

11. The decoding apparatus according to claim 10, further comprising a noise-adding unit that adds noise to an output of the reverse-sorting circuit.

12. The decoding apparatus according to claim 10, wherein the block decoding circuit decodes the encoded block difference data into the block difference data by dequantizing the encoded block difference data and performing an inverse discrete sine transform on the dequantized encoded block difference data.

13. The decoding apparatus according to claim 10, wherein the generating circuit generates the pixel values of the pixels forming the first block by determining pixel differences between the pixel values of the pixels forming the second block and a second minimum value that is a minimum value of the pixel values of the pixels forming the second block, and adding the block difference data and the first minimum value to the determined pixel differences.

14. The decoding apparatus according to claim 10, wherein a dynamic range of the pixel values of the pixels forming the second block identified by the block information matches a dynamic range of the pixel values of the pixels forming the first block.

15. A decoding method comprising the steps of:
- obtaining a first minimum value, block information, sort-order information, and encoded block difference data,
- the first minimum value being a minimum value of pixel values of pixels forming a first block that is one of a plurality of blocks into which a first image is divided,
- the block information identifying a second block corresponding to the first block in a second image different from the first image,
- the sort-order information indicating a sort result of sorting the pixels forming the first block and the second block in order according to pixel differences, the pixel differences being differences between pixel values and a minimum pixel value of pixels forming each block,
- the encoded block difference data being obtained by encoding block difference data indicating an amount of change in the pixel differences for the sorted pixels between the first block and the second block;

decoding the encoded block difference data into the block difference data;

generating pixel values of the pixels forming the first block using the block difference data decoded in the step of decoding, the pixel differences for the pixels forming the second block identified by the block information, and the first minimum value; and reverse-sorting the pixel values of the pixels forming the first block generated in the step of generating in a spatial phase prior to the sorting according to the sort-order information.

16. A non-transitory recording medium having a program recorded thereon, the program causing a computer to execute a process comprising the steps of:

obtaining a first minimum value, block information, sort-order information, and encoded block difference data, the first minimum value being a minimum value of pixel values of pixels forming a first block that is one of a plurality of blocks into which a first image is divided, the block information identifying a second block corresponding to the first block in a second image different from the first image, the sort-order information indicating a sort result of sorting the pixels forming the first block and the second block in order according to pixel differences, the pixel differences being differences between pixel values and a minimum pixel value of pixels forming each block, the encoded block difference data being obtained by encoding block difference data indicating an amount of change in the pixel differences for the sorted pixels between the first block and the second block;

decoding the encoded block difference data into the block difference data;

generating pixel values of the pixels forming the first block using the block difference data decoded in the step of decoding, the pixel differences for the pixels forming the second block identified by the block information, and the first minimum value; and reverse-sorting the pixel values of the pixels forming the first block generated in the step of generating in a spatial phase prior to the sorting according to the sort-order information.

17. An image processing system comprising:

an encoder that encodes input image data including at least a first image and a second image; and a decoder that decodes the encoded input image data;

wherein encoding and decoding are repeatedly performed on the input image data, thereby reducing quality of an image corresponding to the input image data, the encoder including a block forming circuit that divides the first image into a plurality of blocks, a corresponding-block detecting circuit that detects from the second image a second block corresponding to a first block that is one of the plurality of blocks, a sorting circuit that sorts pixels forming each of the first block and the second block in order according to pixel values, a differential circuit that determines block difference data indicating an amount of change in the pixel values of the sorted pixels between the first block and the second block, and an encoding circuit that encodes the block difference data.

18. An image processing system comprising:

an encoder that encodes input image data including at least a first image and a second image; and a decoder that decodes the encoded input image data;

wherein encoding and decoding are repeatedly performed on the input image data, thereby reducing quality of an image corresponding to the input image data, the decoder including a data separating circuit that obtains a first minimum value, block information, sort-order information, and encoded block difference data, the first minimum value being a minimum value of pixel values of pixels forming a first block that is one of a plurality of blocks into which a first image is divided, the block information identifying a second block corresponding to the first block in a second image different from the first image, the sort-order information indicating a sort result of sorting the pixels forming the first block and the second block in order according to pixel differences, the pixel differences being differences between pixel values and a minimum pixel value of pixels forming each block, the encoded block difference data being obtained by encoding block difference data indicating an amount of change in the pixel differences for the sorted pixels between the first block and the second block, a block decoding circuit that decodes the encoded block difference data into the block difference data, a generating circuit that generates pixel values of the pixels forming the first block using the block difference data decoded by the block decoding circuit, the pixel differences for the pixels forming the second block identified by the block information, and the first minimum value, and a reverse-sorting circuit that reverse-sorts the pixel values of the pixels forming the first block generated by the generating circuit in a spatial phase prior to the sorting according to the sort-order information.

19. A decoding apparatus comprising:

a data separating circuit for obtaining block information, sort-order information, and encoded block difference data, the block information identifying a block corresponding to a first block that is one of a plurality of blocks into which a first image is divided, as a second block, from a second image different from the first image, the sort-order information indicating a sort result of sorting pixels forming the first block and the second block in order according to pixel values, the encoded block difference data being obtained by encoding block difference data indicating an amount of change in the pixel values of the sorted pixels between the first block and the second block;

a block decoding circuit for decoding the encoded block difference data into the block difference data;

a generating circuit for generating pixel values of the pixels forming the first block using the block difference data decoded by the block decoding circuit and the pixel values of the pixels forming the second block identified by the block information; and a reverse-sorting circuit for reverse-sorting the pixel values of the pixels forming the first block generated by the generating circuit in a spatial phase prior to the sorting according to the sort-order information.

20. A decoding method comprising the steps of:

obtaining block information, sort-order information, and encoded block difference data, the block information identifying a block corresponding to a first block that is one of a plurality of blocks into which a first image is divided, as a second block, from a second image different from the first image, the sort-order information indicating a sort result of sorting pixels forming the first block and the second block in order according to pixel values, the encoded block difference data being obtained by encoding block difference data indicating an amount of change in the pixel values of the sorted pixels between the first block and the second block;

decoding the encoded block difference data into the block difference data;

generating pixel values of the pixels forming the first block using the block difference data decoded in the step of decoding and the pixel values of the pixels forming the second block identified by the block information; and reverse-sorting the pixel values of the pixels forming the first block generated in the step of generating in a spatial phase prior to the sorting according to the sort-order information.

21. An image processing system comprising:

a recording apparatus that records an image on a non-transitory recording medium, the recording apparatus comprising an encoder that encodes input image data including at least a first image and a second image;

a playback apparatus that plays back the image recorded on the non-transitory recording medium, the playback apparatus comprising a decoder that decodes the encoded input image data;

wherein encoding and decoding are repeatedly performed on the input image data, thereby reducing quality of an image corresponding to the input image data, the decoder including an obtaining unit that obtains block information, sort-order information, and encoded block difference data, the block information identifying a block corresponding to a first block that is one of a plurality of blocks into which a first image is divided, as a second block, from a second image different from the first image, the sort-order information indicating a sort result of sorting pixels forming the first block and the second block in order according to pixel values, the encoded block difference data being obtained by encoding block difference data indicating an amount of change in the pixel values of the sorted pixels between the first block and the second block, a block difference data decoding unit that decodes the encoded block difference data into the block difference data, a generating unit that generates pixel values of the pixels forming the first block using the block difference data decoded by the block difference data decoding unit and the pixel values of the pixels forming the second block identified by the block information, and a reverse-sorting unit that reverse-sorts the pixel values of the pixels forming the first block generated by the generating unit in a spatial phase prior to the sorting according to the sort-order information; and a display that displays the image played back by the playback apparatus.

22. An apparatus comprising:

an analog-to-digital converter circuit that converts an analog input image signal into a digital input image signal;

an encoder for encoding the digital input image signal including at least a first image and a second image, the encoder comprising block dividing means for dividing the first image into a plurality of blocks;

corresponding-block detecting means for detecting from the second image a second block corresponding to a first block that is one of the plurality of blocks;

sorting means for sorting pixels forming each of the first block and the second block in order according to pixel values;

difference data determining means for determining block difference data indicating an amount of change in the pixel values of the sorted pixels between the first block and the second block; and encoding means for encoding the block difference data; and a recorder for recording the encoded digital input image signal on a non-transitory recording medium.

23. An apparatus comprising:

a decoder for decoding an encoded digital image signal, the decoder comprising obtaining means for obtaining a first minimum value, block information, sort-order information, and encoded block difference data, the first minimum value being a minimum value of pixel values of pixels forming a first block that is one of a plurality of blocks into which a first image is divided, the block information identifying a second block corresponding to the first block in a second image different from the first image, the sort-order information indicating a sort result of sorting the pixels forming the first block and the second block in order according to pixel differences, the pixel differences being differences between pixel values and a minimum pixel value of pixels forming each block, the encoded block difference data being obtained by encoding block difference data indicating an amount of change in the pixel differences for the sorted pixels between the first block and the second block;

block difference data decoding means for decoding the encoded block difference data into the block difference data;

generating means for generating pixel values of the pixels forming the first block using the block difference data decoded by the block difference data decoding means, the pixel differences for the pixels forming the second block identified by the block information, and the first minimum value; and reverse-sorting means for reverse-sorting the pixel values of the pixels forming the first block generated by the generating means in a spatial phase prior to the sorting according to the sort-order information;

a digital-to-analog converter circuit to convert the decoded digital image signal into an analog image signal; and a display to display the analog image signal.

24. An apparatus comprising:

a decoder for decoding an encoded digital image signal read from a non-transitory recording medium, the decoder comprising an obtaining unit that obtains block information, sort-order information, and encoded block difference data, the block information identifying a block corresponding to a first block that is one of a plurality of blocks into which a first image is divided, as a second block, from a second image different from the first image, the sort-order information indicating a sort result of sorting pixels forming the first block and the second block in order according to pixel values, the encoded block difference data being obtained by encoding block difference data indicating an amount of change in the pixel values of the sorted pixels between the first block and the second block;

a block difference data decoding unit that decodes the encoded block difference data into the block difference data;

a generating unit that generates pixel values of the pixels forming the first block using the block difference data decoded by the block difference data decoding unit and the pixel values of the pixels forming the second block identified by the block information; and a reverse-sorting unit that reverse-sorts the pixel values of the pixels forming the first block generated by the generating unit in a spatial phase prior to the sorting according to the sort-order information;

a digital-to-analog converter circuit to convert the decoded digital image signal into an analog image signal; and a display to display the analog image signal.

* * * * *